(12) United States Patent
Matsugashita

(10) Patent No.: US 10,425,421 B2
(45) Date of Patent: Sep. 24, 2019

(54) AUTHORIZATION SERVER, CONTROL METHOD, AND STORAGE MEDIUM

(71) Applicant: CANON KABUSHIKI KAISHA, Tokyo (JP)

(72) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 15/608,513

(22) Filed: May 30, 2017

(65) Prior Publication Data

US 2017/0359354 A1    Dec. 14, 2017

(30) Foreign Application Priority Data

Jun. 9, 2016   (JP) ................................. 2016-115518

(51) Int. Cl.
*H04L 29/06*   (2006.01)
(52) U.S. Cl.
CPC ............ *H04L 63/104* (2013.01); *H04L 63/08* (2013.01); *H04L 63/102* (2013.01)

(58) Field of Classification Search
CPC ........ H04L 63/04; H04L 63/08; H04L 63/102
USPC ............................................................ 726/4
See application file for complete search history.

(56) References Cited

U.S. PATENT DOCUMENTS

2014/0090028 A1* 3/2014 Matsugashita .......... H04L 63/08
726/4

FOREIGN PATENT DOCUMENTS

JP    2017-027459 A    2/2017

* cited by examiner

*Primary Examiner* — Michael S McNally
(74) *Attorney, Agent, or Firm* — Canon U.S.A., Inc. I.P. Division

(57) ABSTRACT

During execution of authority transfer, a scope group obtained by grouping a plurality of scopes is used to perform authority transfer. Performing authority transfer with a scope group enables continuing the use of an application programming interface (API) without requiring a user to re-perform authorization confirmation even in a case where a scope is added to or removed from the scope group.

13 Claims, 16 Drawing Sheets

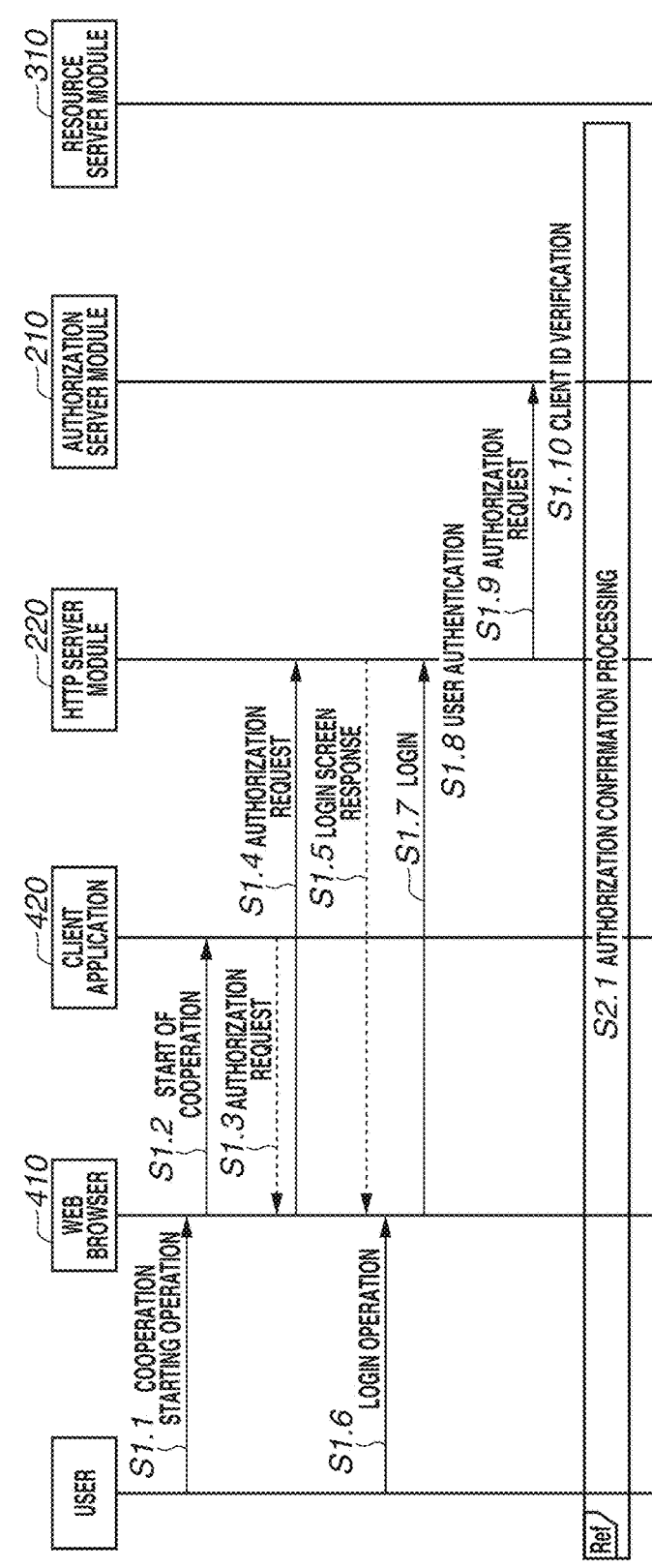

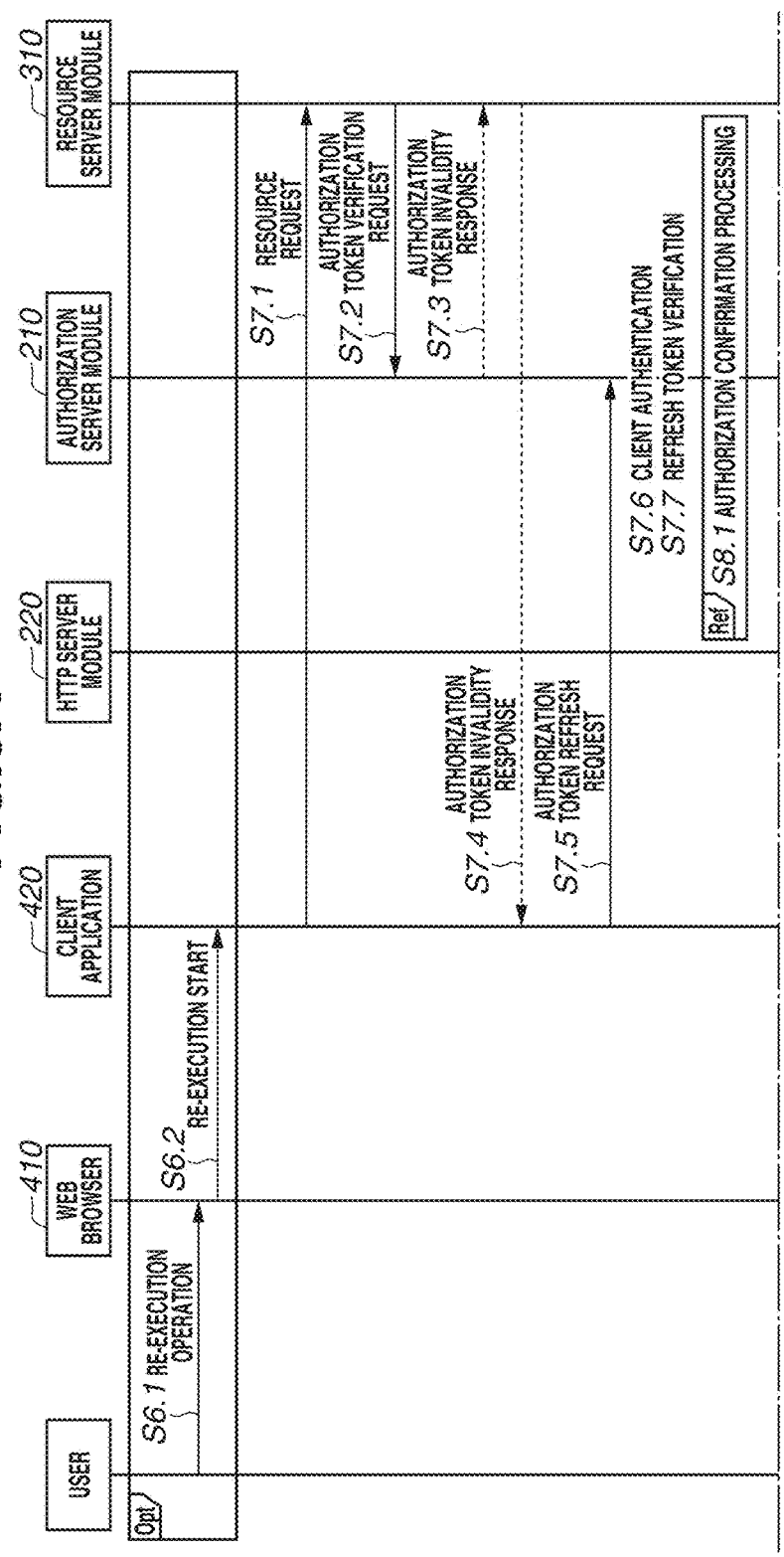

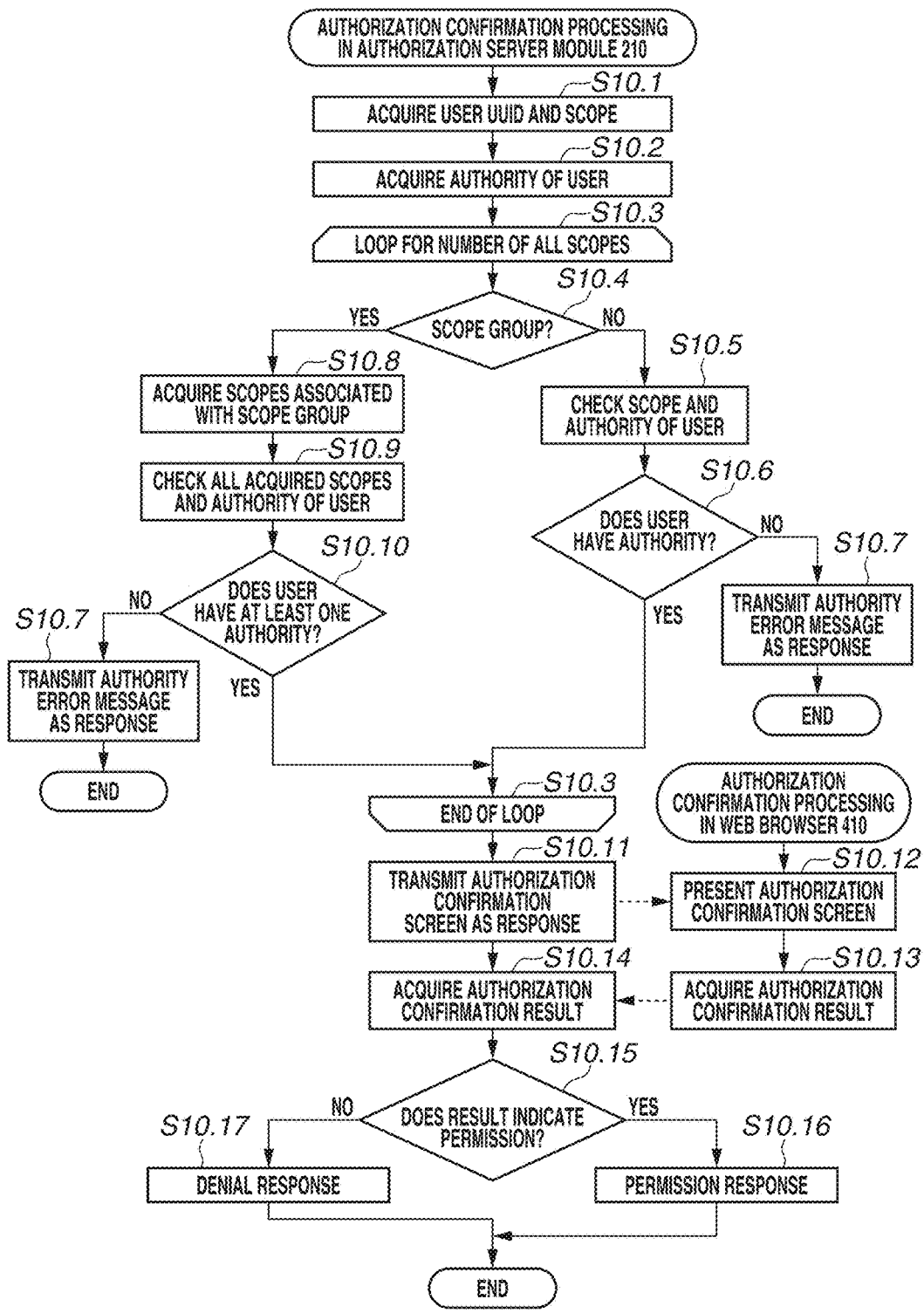

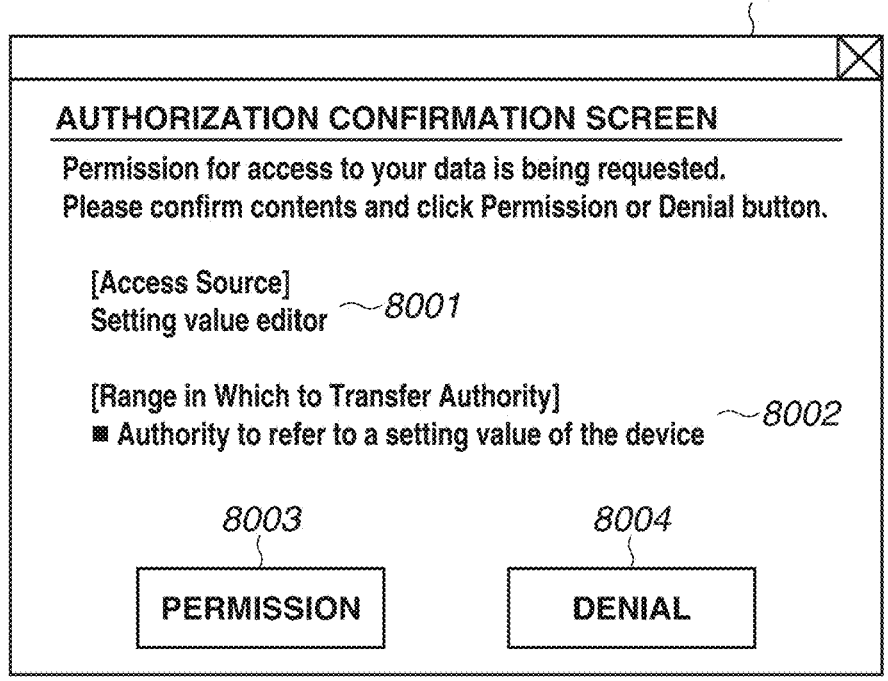
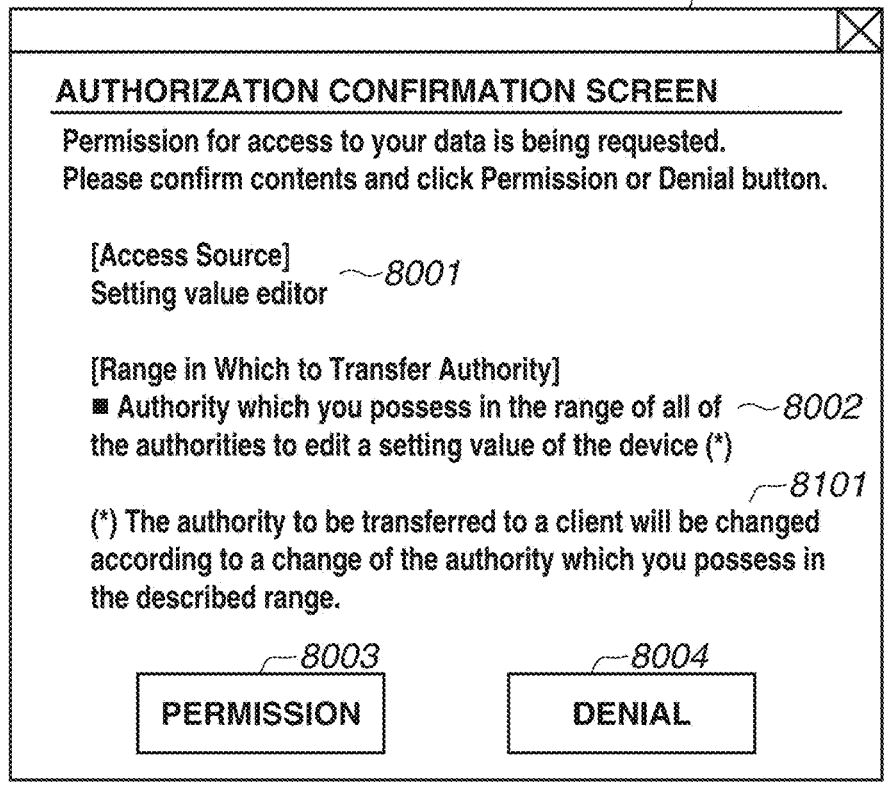

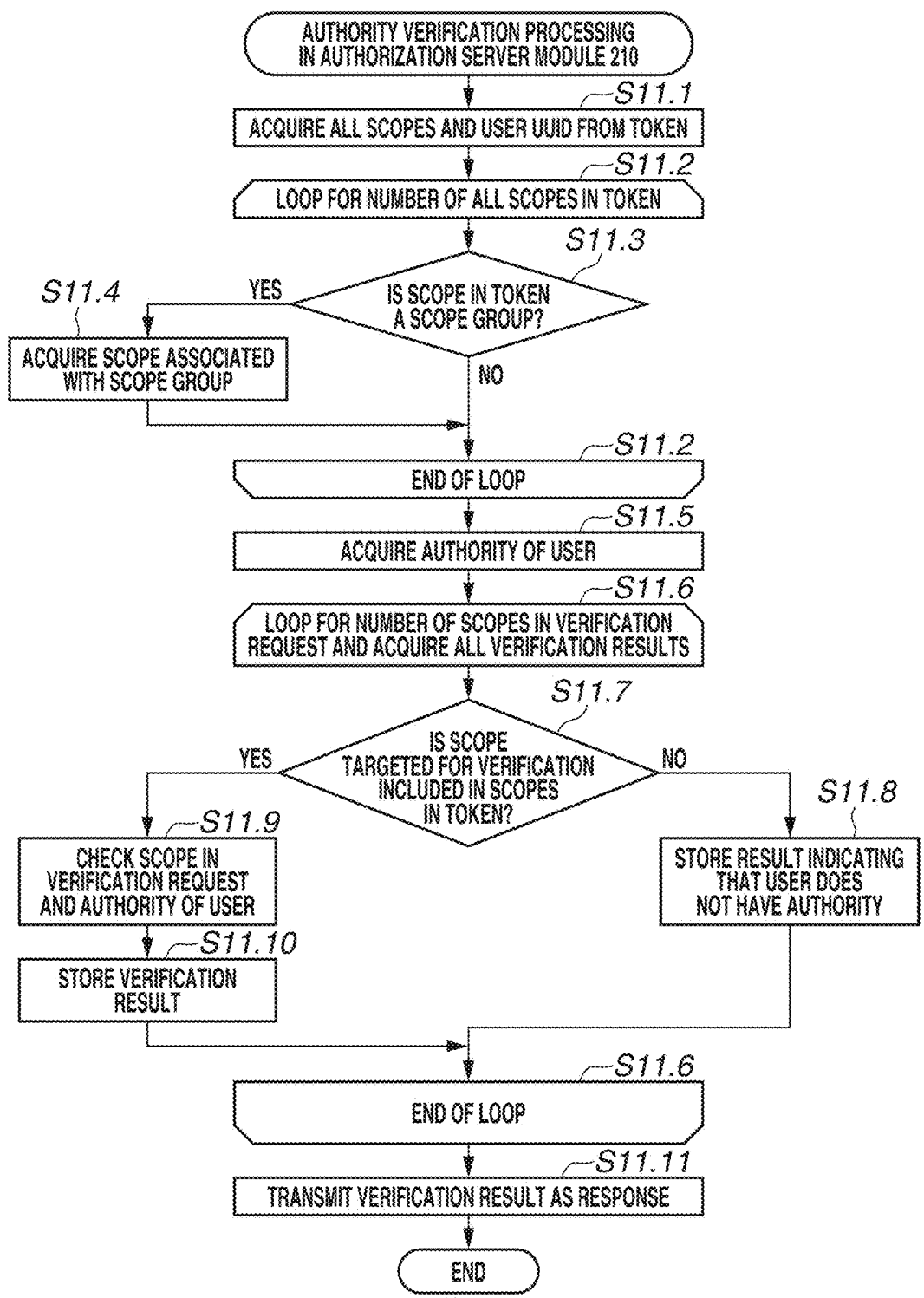

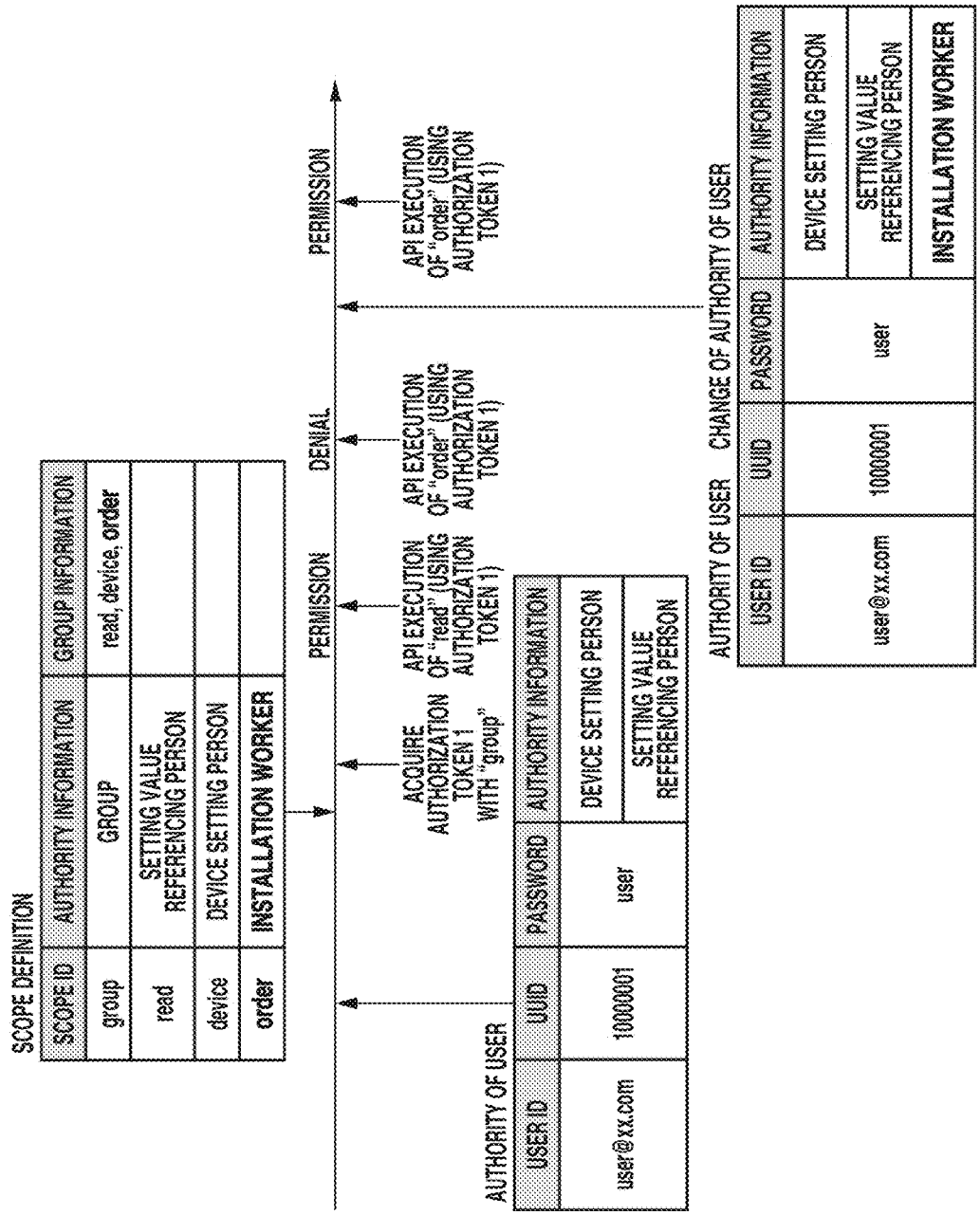

OAuth 2.0 SETTING SCREEN

OVERALL SETTING

- ☐ In case of a change in authority, authorization confirmation is always requested. — *11001*

SETTING FOR EACH CLIENT

*11002*

In case of a change in authority, please check off a client with respect to which authorization confirmation is always requested.

- ☑ Setting value editor
- ☐ xxxxx

SETTING FOR EACH SCOPE GROUP

*11003*

In case of a change in authority, please check off a scope group with respect to which authorization confirmation is always requested.

- ☑ Setting value operation scope group (group)
- ☐ xxxxx

*11004*     *11005*

[ SAVE ]     [ CLOSE ]

AUTHORIZATION SERVER, CONTROL METHOD, AND STORAGE MEDIUM

BACKGROUND

Field

Aspects of the present disclosure generally relate to an authorization server, a control method, and a storage medium for verifying an access authority to data.

Description of the Related Art

In recent years, the use of what is called a cloud service, which has been developed on the Internet, has been expanding. Various cloud services have individually released their application programming interfaces (APIs) of web services, so that the function provided by a service is enabled to be used by another application or cloud service via the API. In these web service APIs, the employment of a standard protocol called "OAuth 2.0" for implementing cooperation regarding authorization has been promoted. Japanese Patent Application Laid-Open No. 2017-027459 discusses an invention using OAuth 2.0.

According to OAuth 2.0, for example, an API that acquires data of a user managed by a service A is allowed to be accessed by a service B within a range permitted by the user. At this time, the service A is supposed to obtain an explicit authorization of the user with respect to an access to the API by the service B while specifying a range that is accessed by the service B. Explicitly performing authorization by the user is referred to as an "authorization operation". The range that is accessed is referred to as a "scope" in the case of OAuth 2.0, and the permissible amount of access to data is determined by the scope.

When the user performs an authorization operation, the service B receives a token that certifies that an access to data in the range permitted by the user in the service A has been allowed (hereinafter referred to as an "authorization token"), so that a subsequent access to the API of the service A can be implemented by using the authorization token. The authorization operation of the user to authorize the service B to access the resource of the user is referred to as "authority transfer".

Protocols that allow authority transfer can lack the flexibility to adapt to a change in resource in the service and a change in authority of the user. For example, an authorization token in OAuth 2.0 allows authority transfer only with respect to a scope confirmed when the user performs an authorization operation. Therefore, in a case where there is a change in the scope with respect to which the user is allowed to perform authority transfer or there is an increase or decrease or a change in the scope that is adapted to use an API, the user can be forced to re-perform an authorization operation in order to use the API, so that convenience may be impaired.

As described above, since the range of a resource that is accessed by a terminal, i.e., a scope that defines the range for using a service, and the authority of a user may change, authority transfer protocols including OAuth 2.0 are required to have flexibility. First, changes of the scope and the authority of a user are described.

In the field of enterprises, the authority possessed by a user can vary depending on the position of the user. For example, the authority possessed by a user can differ between the position to access information including specific secrets of a company and the position not to access such information, and a scope and an authority possessed by the user in OAuth 2.0 are in a close relationship with each other. In other words, an authority to allow access to a scope that indicates the range of a resource in a service is defined, and an operation for assigning the authority to a particular user is presumed. Since the position of a user can change due to a change in the role of the user in the company or a change in the task thereof, the authority of the user can change on a case-by-case basis due to various factors. In other words, the authority of the user at a certain point of time can differ from the authority of the user at a later point of time, so that the range of a scope with respect to which the user is able to perform authority transfer to a service can vary.

With respect to a cloud service, a method or architecture for implementing the release of new functions at intervals of a short period, called "continuous integration", "continuous delivery", or "continuous deployment", is attracting attention. Then, performing the release of new functions at intervals of a short period is expected to further expand due to the provision of various tools, developmental processes, and design approaches. Performing the release at intervals of a short period means that an increase of APIs of web services or an expansion of the range or a change of the range of data that is handled by the specific API is performed at intervals of a short period.

In summary, a change in the scope with respect to which the user is able to perform authority transfer due to a change in the authority of the user, an increase or decrease in scopes due to the release at a short cycle, and a change in the definition of a scope are supposed to be performed. In a case where such situation has occurred, authority transfer has been performed, and an authorization token has been issued, the user is required to re-perform an authorization operation to cause an authorization token that adapts to a change in the authority of the user and/or a change in the scope to be issued.

What is needed is enabling operation of an authorization token that adapts to a change in the authority of the user and/or a change in the scope while saving the trouble of the authorization operation and enhancing convenience.

SUMMARY

Aspects of the present disclosure are generally directed to providing an authorization server that changes an authority of the user or the definition of a scope without impairing user convenience.

According to an aspect of the present disclosure, an authorization server that performs authentication processing and authorization processing for a resource server that provides a web service includes a reception unit configured to receive, from a client, an authorization request specifying a scope group with which at least one scope that defines a range in which to use the web service is associated, an issuance unit configured to issue authorization information associated with the scope group in response to an authenticated user performing an authorization operation for transferring an authority of the user in the web service to the client via an authorization confirmation screen displayed by a terminal including the client, and a verification unit configured to acquire at least one scope associated with the scope group when receiving a verification request for the authorization information transmitted for the client to use the web service, and, in a case where a scope targeted for verification specified by the verification request is included in the acquired at least one scope and a scope that defines a range in which the web service is usable with an authority possessed by the user is included in the acquired at least one scope, to transmit, to the resource server, information indicating that an authority to use the web service in the range defined by the scope targeted for verification is transferred to the client.

Further features will become apparent from the following description of exemplary embodiments with reference to the attached drawings.

BRIEF DESCRIPTION OF THE DRAWINGS

FIG. 7 is a flowchart illustrating authorization confirmation processing.

FIGS. 8A and 8B illustrate examples of authorization confirmation screens.

FIG. 9 is a flowchart illustrating authority verification processing.

FIGS. 10A and 10B illustrate time series for changes in authority and scope.

FIG. 11 illustrates an example of an OAuth 2.0 setting screen in a second exemplary embodiment.

DESCRIPTION OF THE EMBODIMENTS

Figure 1:
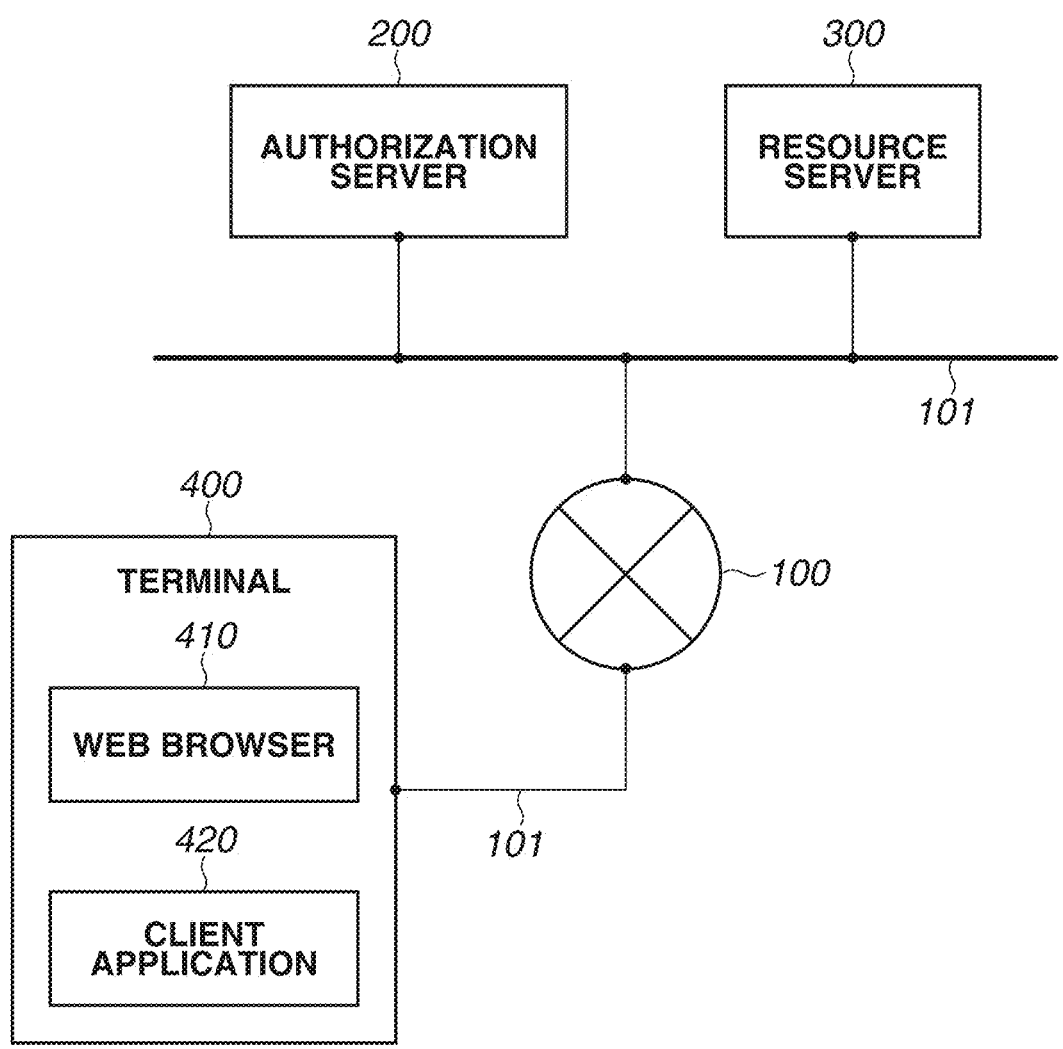
FIG. 1 is a system configuration diagram.

To begin with, the definition of terms used in various exemplary embodiments is described. The term "service" refers to a function that is supplied to a client by software that runs on a server being executed according to a request from the client. A web application serving as the software can also be sometimes called "service". The present exemplary embodiment is described on the assumption that there is a service which a resource server provides as a cloud service and the user uses, via a terminal, the service which the resource server provides. The term "client" refers to software that runs on a terminal, and the client is configured to perform access via a web browser of the terminal or is configured to activate and control software having the function of a web browser. The resource server releases an API as a web service, and the client is supposed to use the API to provide a service to the user.

This is the presumption in describing the present exemplary embodiment, and the client can also be configured as another service that cooperates with the resource server. The resource server and the terminal each do not need to be configured as a single device. For example, a server group configured with a plurality of devices can provide a service. The term "server system" as used in the present exemplary embodiment refers to a server configured with a single device or a plurality of devices.

For the client to use the API of the resource server, authority transfer accompanied by an authorization operation of the user according to Authorization Code Grant in OAuth 2.0, which is described below, becomes required. In other words, the client having received authority transfer from the user becomes able to use the API of the resource server.

Next, an example of a service that the resource server provides, which is used in various exemplary embodiments of the present invention, is described. The resource server includes a function to deliver various pieces of data to a multifunction peripheral or a printer (each not illustrated) in response to a request from the multifunction peripheral or the printer. Here, various pieces of data conceivable include setting values for determining how the multifunction peripheral or the printer operates, information about firmware or an application that is to be installed on the multifunction peripheral or the printer, and optional functions that are settable to the multifunction peripheral or the printer. Various pieces of data conceivable also include, for example, control information indicating in what order the various pieces of data are to be set and license information used for installing an application.

The present exemplary embodiment is described on the assumption that the client application includes the following function as an example. The client application includes a function to generate various pieces of data that are to be delivered to a multifunction peripheral or a printer and to upload the various pieces of data to the resource server as data for an individual multifunction peripheral or an individual printer.

Various exemplary embodiments, features, and aspects will be described below with reference to the drawings. An authority transfer system according to the present exemplary embodiment is implemented in a network with a configuration such as that illustrated in FIG. 1. A wide area network (WAN) 100 is structured as a World Wide Web (WWW) system in the present exemplary embodiment. A local area network (LAN) 101 interconnects various elements.

An authorization server 200 is provided with an authorization server module to implement OAuth 2.0. A resource server 300 is provided with a resource server module including an API that is released as a web service. A terminal 400 includes a web browser 410 and a client application 420. The terminal 400 is, for example, a personal computer (PC) or a mobile terminal such as a smartphone. The client application 420 uses the API released by the resource server module included in the resource server 300 and provides, to the user, a service obtained by adding the API to the function that the client application 420 itself provides. The user uses the web browser 410 to communicate with the authorization server 200. The authorization server 200 and the resource server 300 are interconnected via the LAN 101. The authorization server 200, the resource server 300, and the terminal 400 are interconnected via the WAN 100 in such a manner as to be able to communicate with each other. Additionally, the authorization server 200 can be connected to a database server (not illustrated) via the LAN 101, and can be configured to store data that the authorization server module uses. The resource server 300 and the authorization server 200 can also be configured on the same server.

Figure 2:
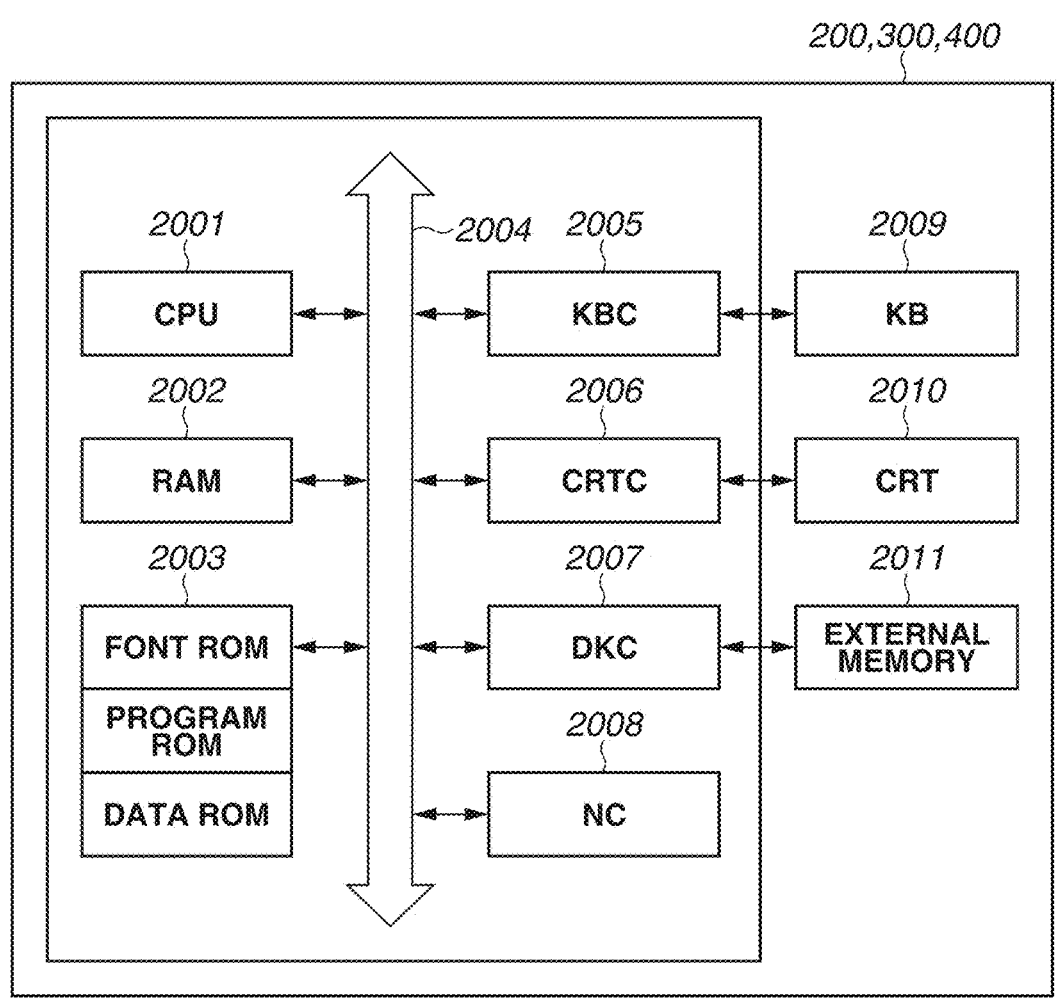
FIG. 2 is a hardware configuration diagram of each apparatus.

The authority transfer system according to the present exemplary embodiment is implemented in a system configured with servers and a terminal each of which includes a configuration such as that illustrated in FIG. 2. FIG. 2 illustrates a hardware configuration of each of the authorization server 200, the resource server 300, and the terminal 400. A hardware block diagram illustrated in FIG. 2 corresponds to a hardware block diagram of a general information processing apparatus, and a hardware configuration of the general information processing apparatus or a virtual hardware configuration of an information processing apparatus that is provided as Infrastructure as a Service (IaaS) can be applied to the servers and the terminal in the present exemplary embodiment.

Referring to FIG. 2, a central processing unit (CPU) 2001 executes programs, such as an operating system (OS) and applications, stored in a program read-only memory (ROM) of a ROM 2003 or loaded from an external memory 2011 such as a hard disk (HD) into a random access memory (RAM) 2002, to control each block connected to a system bus 2004. The OS is system software that runs on a computer. Processing in each sequence described below can be implemented by executing the programs. The RAM 2002 functions as, for example, a main memory or work area for the CPU 2001. A keyboard controller (KBC) 2005 controls key inputs supplied from a keyboard (KB) 2009 or a pointing device (not illustrated). A cathode-ray tube (CRT) controller (CRTC) 2006 controls the displaying operation of a CRT display (CRT) 2010. A disk controller (DKC) 2007 controls data access to the external memory 2011, such as a hard disk (HD), which stores various pieces of data. A network controller (NC) 2008 performs communication control processing for other devices connected via the WAN 100 and the LAN 101.

In the case of a virtual information processing apparatus that is provided as IaaS, the apparatus is not provided with, for example, the KBC 2005 and the CRTC 2006, and is configured to be operated via a keyboard 2009 or a CRT display 2010 included in a terminal connected via the NC 2008. In the following descriptions, unless otherwise stated, the hardware subject for execution in the servers and the terminal is the CPU 2001, and the software subject is an application program installed in the external memory 2011.

Figure 3A:
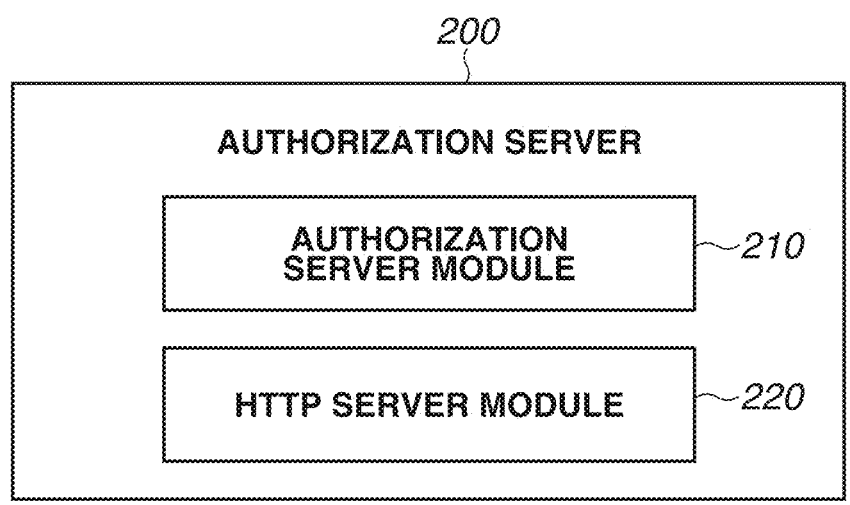
FIGS. 3A and 3B are software configuration diagrams of respective apparatuses.
Figure 3B:
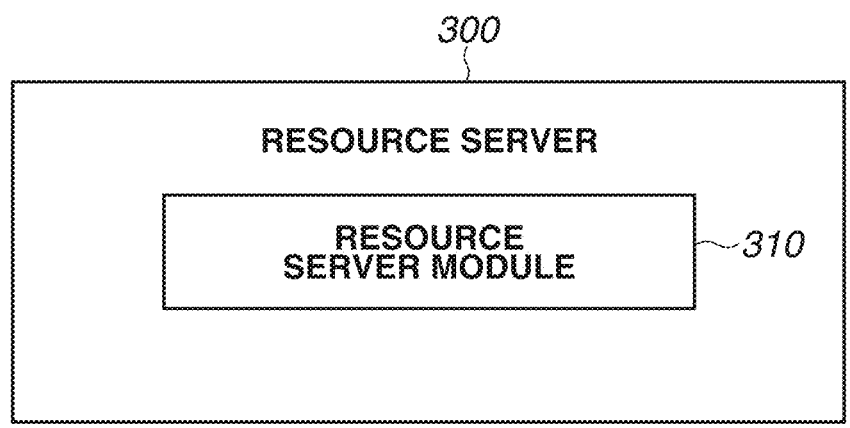

FIGS. 3A and 3B illustrate respective module configurations of the authorization server 200 and the resource server 300, which execute the respective modules to provide a service. The authorization server 200 and the resource server 300 have the same configuration as that illustrated in FIG. 2. Software modules included in the respective devices in the authority transfer system, including software modules of the terminal 400, are implemented by the CPU 2001 of each device executing a program loaded on the RAM 2002.

Referring to FIG. 3A, the authorization server 200 includes an authorization server module 210 and a Hyper-Text Transfer Protocol (HTTP) server module 220. The HTTP server module 220 is a module used to perform HTTP communication with the web browser 410 or the client application 420 set in the terminal 400 connected via the WAN 100. The HTTP server module 220 is configured to perform communication using Secure Sockets Layer/Transport Layer Security (SSL/TLS), and includes a certificate store (not illustrated). In the present exemplary embodiment, when receiving an authorization request, which is described below, the HTTP server module 220 is configured to request a user authentication using a user identifier (ID) and a password from the requestor. Next, the authorization server module 210 is a web application that operates on or in cooperation with the HTTP server module 220, and receives a request from the web browser 410 via the HTTP server module 220, processes the request, and responds to the request. At that time, in the present exemplary embodiment, the HTTP server module 220 receives a user authentication request, and, when the authentication of the requestor succeeds, the HTTP server module 220 generates an authentication token associated with the authenticated user information and sends the authentication token to the authorization server module 210.

Here, the term "authentication token" refers to a token indicating that the user is authenticated and logged in or a token used to verify whether the user is authenticated, and using the authentication token enables identifying the user. An authorization token, which is described below, is a token indicating that a client having received authority transfer by an authorization operation of the authenticated user is permitted to perform access in place of the user on the authority of the user, and is thus different from the authentication token. A difference between two tokens is that, while the authentication token is directed to confirmation of the user, the authorization token is directed to confirmation of the authority.

The authorization token is a token that the client acquires using an authorization code and that indicates that the client has the authority to use the API. A refresh token is a token that the client also acquires using an authorization code and that indicates that an authorization token can be reissued. Details of processing in the HTTP server module 220 and the authorization server module 210 are described below. The authorization server module 210 is configured to receive a request for authority verification processing of an authorization token from a resource server module 310 via the LAN 101, process the request, and send a response concerning the permission and denial of access by the client to the resource server 300. The authority verification processing of an authorization token can be configured as a remote procedure call (RPC) or can be configured as an API of a web service that performs communication within the LAN 101 via the HTTP server module 220.

Referring to FIG. 3B, the resource server 300 includes the resource server module 310. The resource server module 310 can be configured to run on an HTTP server module (not illustrated). The resource server module 310 includes an API that is released as a web service, and receives a resource request from the client application 420, which is described below, processes the resource request, and sends a response. The resource server module 310 requests the authorization server module 210 via the LAN 101 to perform authority verification processing of an authorization token, which is described below.

Figure 4B:
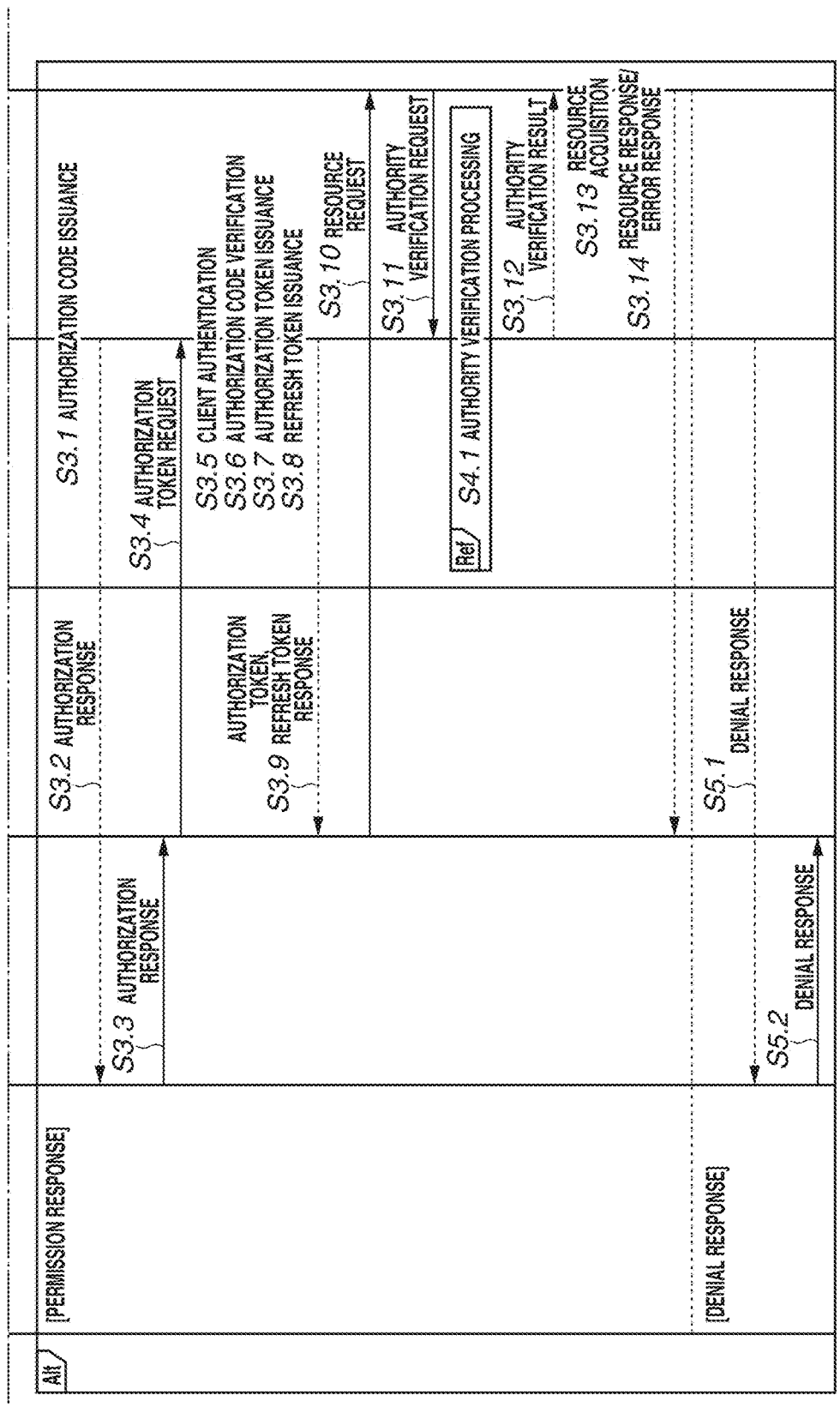
FIG. 4, which is composed of FIGS. 4A and 4B, illustrates a sequence in OAuth 2.0.

Next, a sequence in the present exemplary embodiment performed until the client application 420 uses an API, which the resource server module 310 releases, is described with reference to FIG. 4, which is composed of FIGS. 4A and 4B, FIG. 5, and tables illustrated below. "Ref" in FIG. 5 indicates reference, which is illustrated in another figure. "Alt" indicates branching, which is branch processing caused by the result of a prior sequence.

First, data examples of a user table and a client table in the authorization server module 210 are illustrated in Table 1 and Table 2 below.

TABLE 1

User Table in Authorization Server Module

| | User ID | UUID | Password | Authority Information |
|---|---|---|---|---|
| Row 1 | admin@xx.com | 10000000 | administrator | Administrator |
| Row 2 | | | | Setting Value Editor |
| Row 3 | | | | Setting Value Referencing Person |

TABLE 1-continued

User Table in Authorization Server Module

| | User ID | UUID | Password | Authority Information |
|---|---|---|---|---|
| Row 4 | user@xx.com | 10000001 | user | Device Setting Person |
| Row 5 | | | | Setting Value Referencing Person |

TABLE 2

Client Table in Authorization Server Module

| | Client ID | Secret | Client Name | Redirect URI |
|---|---|---|---|---|
| Row 1 | c001@xx.com | xxxxxxxxxx | Setting Value Editor | https://localhost:xx |

A data example of a scope definition table in the authorization server module 210 is illustrated in Table 3 below.

TABLE 3

Scope Definition Table in Authorization Server Module

| | Scope ID | Authority Information | Group Information |
|---|---|---|---|
| Row 1 | group | Group | admin, edit, read, device |
| Row 2 | admin | Administrator | |
| Row 3 | edit | Setting Value Editor | |
| Row 4 | read | Setting Value Referencing Person | |
| Row 5 | device | Device Setting Person | |

In the present exemplary embodiment, an administrator authority, which has the ability to perform all of the operations on the above-mentioned setting value, a setting value editor authority, which has the ability to edit the setting value, a setting value referencing person authority, which has the ability to refer to the setting value, and a device setting person authority, which has the ability to set, to the setting value, information for specifying a device, such as a multifunction peripheral or a printer, in which to reflect the setting value, are defined as the authorities of the user. The authority and the scope are typically defined in association with each other, and the range of access to data is determined by the scope. The scope defines a range in which to use a service that the resource server module 310 provides, and the permissible amount of access to data is determined by the scope.

For example, in a case where a scope called "read", which corresponds to the authority of the setting value referencing person, is defined, the client application 420 can perform an authority transfer protocol using the scope called "read" and to acquire an authorization token corresponding to the scope called "read". Then, using the acquired authorization token, the client application 420 can use an API for referring to various setting values in the resource server module 310. The acquired authorization token, however, does not enable using an API for editing a setting value. In order to edit a setting value, the client application 420 is required to specify a scope called "edit" corresponding to the editing authority and acquire a corresponding authorization token.

Therefore, it is conceivable that, when the authority transfer protocol is performed, both the scope called "read" and the scope called "edit" are specified at the client application 420. However, in a case where the user is not assigned the authority of the setting value editor, an error occurs in authorization confirmation processing, so that the authorization token cannot be acquired.

In the present exemplary embodiment, a plurality of scopes is put together to form a group, and, in a case where the user possesses at least one authority from among authorities corresponding to scopes included in the group, a definition called a "scope group" for permitting the issuance of an authorization token in authorization confirmation processing is additionally provided. More specifically, for example, a scope group called "group" obtained by grouping scopes called "admin", "edit", "read", and "device" is defined. Since "group" is associated with all of the scopes shown in Table 3, the user who has been assigned the group authority can use all of the functions that the resource server module 310 provides at the current time. Then, specifying the "group" scope and performing the authority transfer protocol enables even the user who has only the setting value referencing person authority to acquire an authorization token.

However, since the user does not have the setting value editor authority, even the authorization token with "group" specified should not allow the use of an API for editing a setting value in the resource server module 310. Therefore, the resource server module 310 requests the authorization server module 210 to perform authority verification processing for verifying whether the user has the authority, while specifying the acquired authorization token and "edit", which is the scope of an API for editing the setting value. Details of the authority verification processing are described below.

According to processing using a scope group, even if there is a change in the authority of the user, an authorization token acquired with "group" specified enables the user to use an API conforming with the authority of the user. In a case where, for example, a new API requiring a scope "order" for changing the order of control of setting values is added at the resource server module 310 and a scope definition "order" is added at the authorization server module 210, it is usually necessary to specify the "order" scope and re-perform the authority transfer protocol. However, if the "order" scope is defined in association with the scope group "group", as long as the user is assigned the authority, an authorization token acquired with "group" specified can be used as a token for using an API for changing the order of control of setting values.

In response to receiving a request for defining a new scope corresponding to an API that is transmitted in association with the implementation of the API for invoking a new function added to the resource server 300, the authorization server module 210 defines the new scope in the scope definition table. In doing so, while the new scope can be associated with "group", in some cases, the new scope cannot be associated with "group". A request for defining the new scope can be transmitted from a computer (not illustrated) with the same configuration as that of the terminal 400. Details of these processing operations are described as follows.

The user in the description of a sequence performed according to the present exemplary embodiment is supposed to use the user ID "user@xx.com" and its password. The client application 420 in the description of the sequence retains a secret and a redirect URI, which are pieces of data of the client ID "c001@xx.com". The redirect URI is a Uniform Resource Identifier (URI) for the client application 420 to receive an authorization response. While these pieces of data are required to be previously registered in the authorization server module 210, conceivable methods for such registration include using a screen (not illustrated) and using an API that the authorization server module 210 releases.

In step S1.1, the user performs a cooperation starting operation (not illustrated) that is displayed on the web browser 410. In step S1.2, the start of cooperation is transmitted from the web browser 410 to the client application 420. In the processing in steps S1.1 and S1.2, the user can perform an operation via the client application 420 and the client application 420 can invoke the web browser 410. After receiving the start of cooperation, in step S1.3, the client application 420 makes an authorization request to the authorization server module 210 via the web browser 410 and the HTTP server module 220.

Characteristic features of the present exemplary embodiment are described based on the Authorization Code Grant flow defined in OAuth 2.0 as an authority transfer protocol. The authorization request includes at least the client ID "c001@xx.com" and the redirect URI "https://localhost:xx", which are retained by the client application 420, and includes a scope indicating the range of a resource with respect to which the client application 420 receives authority transfer from the user. Here, each of a case where "read" is specified as the scope and a case where the scope group "group" is specified is described. The redirect URI is, as discussed above, a Uniform Resource Locator (URL) of the client application 420 for receiving an authorization code issued by the authorization server 200.

In step S1.4, the HTTP server module 220, after receiving the authorization request from the web browser 410, verifies whether an authentication token that is valid as an HTTP cookie is included in the transmission from the web browser 410. If the authentication token is included in the transmission, the HTTP server module 220 transmits the authentication token to the authorization server module 210, and then proceeds to step S1.9. If the authentication token is not included in the transmission, the HTTP server module 220 performs the following processing.

In step S1.5, the HTTP server module 220 transmits a login screen as a response to the web browser 410 so as to perform user authentication.

Figure 5:
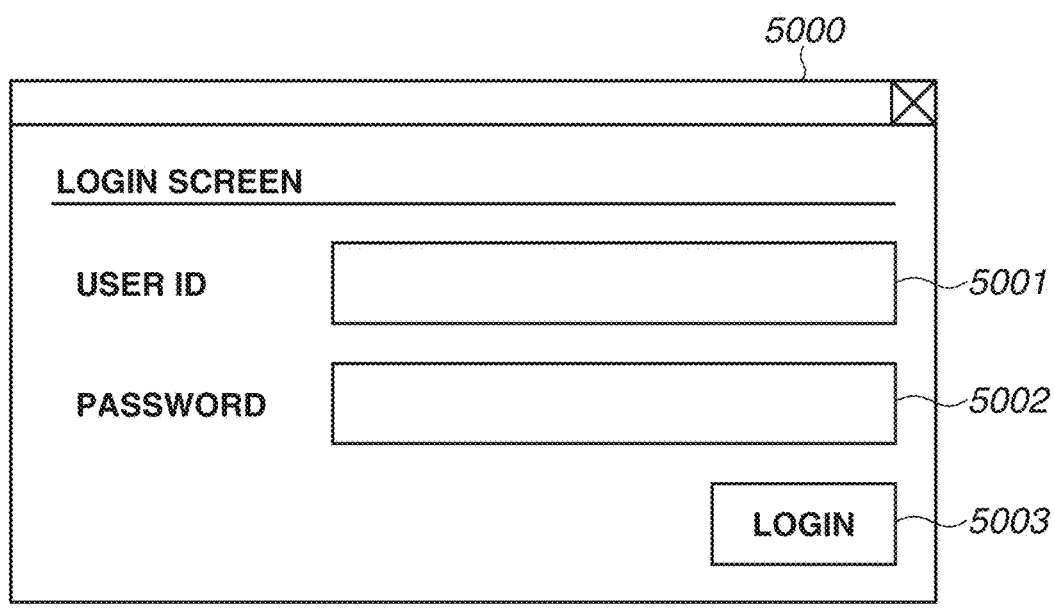
FIG. 5 illustrates an example of a login screen.

FIG. 5 illustrates an example of the login screen transmitted as a response from the HTTP server module 220. In the present exemplary embodiment, when the user inputs a user ID and a password, if they match information registered in a user table in the authorization server module 210, the user is authenticated. The method for authenticating the user can include other methods, such as using X.509 certificates and performing multi-stage authentication by inputting passwords a plurality of times, and is not limited to the above-mentioned method.

The login screen 5000 illustrated in FIG. 5 includes a user ID entry field 5001 for entering a user ID, a password entry field 5002 for entering a password, and a login button 5003 for performing a login operation. In step S1.6, the user inputs required information to the login screen 5000 displayed on the web browser 410 and then presses the login button 5003. In step S1.7, the web browser 410 transmits the input information to the HTTP server module 220. In step S1.8, the HTTP server module 220 acquires the user ID and the password, and authenticates the user by comparing the acquired user ID and password with a user ID and password in the user table and verifying whether they match each other.

In the present exemplary embodiment, the user ID "user@xx.com" and the password "user" are input to the login screen 5000, and the HTTP server module 220 verifies this data to perform authentication. If user authentication fails, in other words, if the corresponding information is not registered in the user table, the HTTP server module 220 transmits, as a response, an authentication error screen (not illustrated) to the web browser 410. If user authentication succeeds, the HTTP server module 220 generates an authentication token. The authentication token is then stored in a non-volatile memory of the HTTP server module 220 in association with a universally unique identifier (UUID) corresponding to the user ID. The UUID is a unique ID that is not duplicated.

In the present exemplary embodiment, the authentication token is stored in association with the UUID "10000001" corresponding to the user ID "user@xx.com". Then, the HTTP server module 220 transmits the authentication token to the authorization server module 210. The authentication token is set as an HTTP cookie, which is transmitted as a response from the HTTP server module 220 to the web browser 410. Then, during access from the web browser 410 to the authorization server module 210, the verification of the authentication token by the HTTP server module 220, the authentication processing, and the transmission of the authentication token to the authorization server module 210 are performed as discussed above, and thus the description thereof is not repeated.

After receiving the authorization request including the authentication token in step S1.9, in step S1.10, the authorization server module 210 verifies whether the client ID and the redirect URI in the received authorization request is correct. More specifically, the authorization server module 210 verifies whether received client ID and redirect URI matches with a client ID and a redirect URI registered in the client table. If the received client ID and redirect URI do not match the registered client ID and redirect URI, the authorization server module 210 transmits, as a response, an error screen (not illustrated) to the web browser 410 via the HTTP server module 220. If the received client ID and redirect URI match the registered client ID and redirect URI, then in step S2.1, the authorization server module 210 performs authorization confirmation processing. The authorization confirmation processing in step S2.1 is described below.

Next, a sequence performed in a case where, in the authorization server module 210, the result of the authorization confirmation processing in step S2.1 is [permission response] is described. In step S3.1, the authorization server module 210 issues an authorization code. More specifically, the authorization server module 210 issues the token ID "cd_000001" or "cd_000002", and registers the client ID "c001@xx.com" and the redirect URI "https://xx/res", the scope, and the UUID "10000001" corresponding to the user ID of the authenticated user in the token table stored in the authorization server module 210. Additionally, at that time, the authorization server module 210 sets the token type as an authorization code and registers the date and time of expiration of a period during which the authorization code is valid as an expiration date.

An example of the token table in the authorization server module 210 is shown in Table 4 below. While, in the example, a state indicating whether the token is valid is registered as "valid", a configuration in which the validity is confirmed every time by verifying the expiration date can be implemented. The scope can be set as "read" or the scope group "group" is set.

TABLE 4

Token Table in Authorization Server Module

| | Token ID | Type | Client ID | UUID | Scope |
|---|---|---|---|---|---|
| Row 1 | cd_000001 | Authorization Code | c001@xx.com | 10000001 | read |
| Row 2 | cd_000002 | Authorization Code | c001@xx.com | 10000001 | group |

| | Redirect URI | State | Expiration Date |
|---|---|---|---|
| Row 1 | https://localhost:xx | Valid | 2016 Jan. 1 0:00 |
| Row 2 | https://localhost:xx | Valid | 2016 Jan. 1 0:00 |

Then, in steps S3.2 and S3.3, the authorization server module 210 transmits an authorization response, to which the token ID "cd_000001" or "cd_000002" of the issued authorization code is added, to the client application 420 via the web browser 410. More specifically, the authorization server module 210 transmits a redirect response to the web browser 410 in such a way as to redirect the web browser 410 to the redirect URI "https://localhost:xx" acquired during the authorization request.

In step S3.4, the client application 420 requests an authorization token from the authorization server module 210. The authorization token request includes at least the acquired authorization code "cd_000001" or "cd_000002", the client ID "c001@xx.com", the secret "xxxxxxxxxx", and the redirect URI "https://localhost:xx" transmitted during the authorization request.

In step S3.5, the authorization server module 210 authenticates the client based on a set of the acquired client ID "c001@xx.com" and the secret "xxxxxxxxxx". More specifically, the authorization server module 210 performs authentication by verifying whether the client ID "c001@xx.com" and the secret match the client ID and the secret in the client table. If the client authentication fails, the authorization server module 210 transmits an authentication error as a response to the client application 420. If the client authentication succeeds, then in step S3.6, the authorization server module 210 verifies the acquired authorization code "cd_000001" or "cd_000002". When verifying the authorization code, the authorization server module 210 verifies whether the acquired authorization code is registered in the token table and, if registered, verifies whether the acquired authorization code is valid. The authorization server module 210 also verifies whether the client ID "c001@xx.com" and the redirect URI "https://localhost:xx" acquired during the authorization token request match a client ID and a redirect URI in the token table.

If the result of the authorization code verification indicates that the authorization code is invalid, the authorization server module 210 transmits a token invalidity error as a response to the client application 420. If the result of the authorization code verification indicates that the authorization code is valid, then in step S3.7, the authorization server module 210 issues an authorization token. More specifically, the authorization server module 210 issues a token ID "at_000001" or "at_000002", and registers the UUID "10000001" of the user, the scope "read" or "group", and the authenticated client ID "c001@xx.com", which are associated with the authorization code, in the token table. At that time, the authorization server module 210 sets the token type as an authorization token and registers the date and time of expiration of a period during which the authorization token is valid as an expiration date. Then, in step S3.8, the authorization server module 210 issues a refresh token. More specifically, the authorization server module 210 issues a token ID "rt_000001" or "rt_000002", and registers the UUID "10000001" of the user, the scope, and the authenticated client ID, which are associated with the authorization token, in the token table. At that time, the authorization server module 210 sets the token type as a refresh token, and registers the date and time of expiration of a period during which the refresh token is valid as an expiration date.

Since, in the case of OAuth 2.0, control is recommended to be implemented in such a manner that an authorization code is usable only once, the state of the authorization code of the token ID "cd_000001" or "cd_000002" is set to "invalid". In addition to the method of setting the state to "invalid", a method of renewing the expiration date to the past date and time to treat the authorization code as invalid or a method of deleting the record itself in the table can be used to invalidate the authorization code.

An example of the token table in the authorization server module 210 is illustrated in Table 5 below. The example indicates a state in which data is added to the token table in the authorization server module 210 illustrated in Table 4.

TABLE 5

Token Table in Authorization Server Module

|  | Token ID | Type | Client ID | UUID | Scope | Redirect URI | State | Expiration Date |
|---|---|---|---|---|---|---|---|---|
| Row 1 | cd_000001 | Authorization Code | c001@xx.com | 10000001 | read | https://localhost:xx | Invalid | 2016 Jan. 1 0:00 |
| Row 2 | cd_000002 | Authorization Code | c001@xx.com | 10000001 | group | https://localhost:xx | Invalid | 2016 Jan. 1 0:00 |
| Row 3 | at_000001 | Authorization Token | c001@xx.com | 10000001 | read |  | Valid | 2016 Jan. 1 0:00 |
| Row 4 | rt_000001 | Refresh Token | c001@xx.com | 10000001 | read |  | Valid | 2017 Jan. 1 0:00 |
| Row 5 | at_000002 | Authorization Token | c001@xx.com | 10000001 | group |  | Valid | 2016 Jan. 1 0:00 |
| Row 6 | rt_000002 | Refresh Token | c001@xx.com | 10000001 | group |  | Valid | 2017 Jan. 1 0:00 |

Then, in step S3.9, the authorization server module 210 transmits the issued token ID "at_000001" or "at_000002" of the authorization token and the issued token ID "rt_000001" or "rt_000002" of the refresh token as a response to the client application 420.

In step S3.10, the client application 420, having received the authorization token, makes a resource request to an API that the resource server module 310 releases. More specifically, it is presumed that the client application 420 invokes an API for referring to the setting value using the authorization token.

In step S3.11, the resource server module 310, having received the resource request, requests the authorization server module 210 to perform authority verification. At that time, the resource server module 310 passes the acquired authorization token "at_000001" or "at_000002" and the scope "read" of the requested resource serving as a verification target to the authorization server module 210. Authority verification processing performed by the authorization server module 210 in step S4.1 is described below.

In step S3.12, the resource server module 310 acquires a result of the authority verification from the authorization server module 210. If the result indicates permission, then in step S3.13, the resource server module 310 acquires a resource, more specifically, the requested setting value, and then in step S3.14, transmits the resource as a response to the client application 420. If the result of the authority verification indicates denial, the resource server module 310 skips step S3.13, and then in step S3.14, the resource server module 310 transmits an error message as a response to the client application 420.

Next, a sequence performed in a case where the result of the authorization confirmation processing by the authorization server module 210 in step S2.1 is [denial response] described. In steps S5.1 and S5.2, the authorization server module 210 transmits a denial response to the client application 420 via the web browser 410. More specifically, the authorization server module 210 transmits a redirect response to the web browser 410 in such a way as to redirect the web browser 410 to the redirect URI "https://localhost:xx" acquired during the authorization request.

Thus far, the sequence in the present exemplary embodiment using the authority transfer protocol performed until the client application 420 uses the API that the resource server module 310 releases has been described. While the processing for issuing an authorization token has been described using Authorization Code Grant in OAuth 2.0 as an example, it is not limiting as long as an authority transfer protocol is used. For example, an authorization code does not necessarily need to be issued, and an authorization token serving as authorization information only has to be finally issued.

Figure 6B:
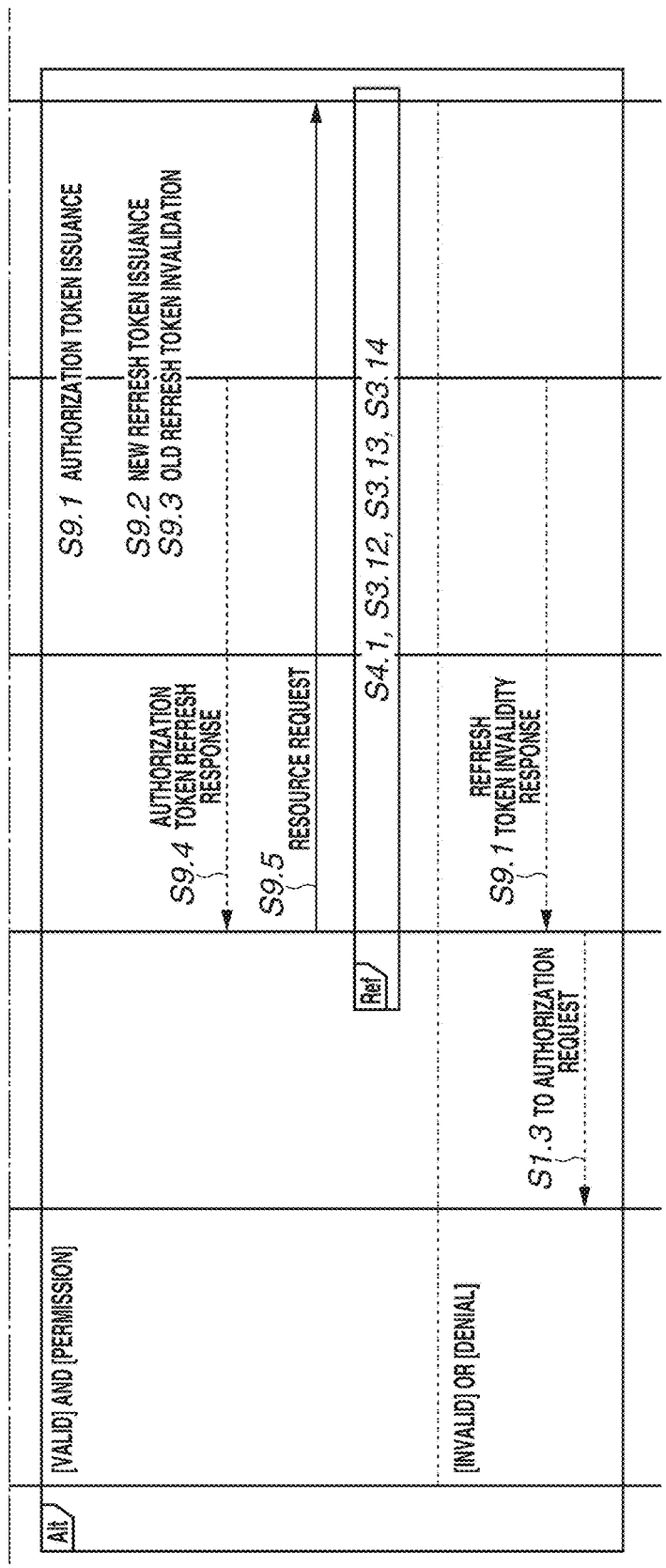
FIG. 6, which is composed of FIGS. 6A and 6B, illustrates a refresh sequence in OAuth 2.0.

Next, a refresh sequence in the authority transfer protocol for the client application 420 to refresh an authorization token and use an API that the resource server module 310 releases is described with reference to FIG. 6, which is composed of FIGS. 6A and 6B. "Alt" in FIG. 6 indicates branching, which is branch processing caused by the result of a prior sequence. "Opt" indicates an option, which is omissible processing.

The sequence illustrated in FIG. 6 includes a case where the sequence is started with the user operation in step S6.1 and a case where the client application 420 starts the sequence during its own processing. Therefore, steps S6.1 and S6.2 are illustrated as options.

In step S6.1, the user performs a re-execution operation (not illustrated) displayed on the web browser 410. In step S6.2, a re-execution is transmitted from the web browser 410 to the client application 420. In step S7.1, the client application 420, having received the re-execution, makes a resource request to an API that the resource server module 310 releases, using the previously acquired authorization token "at_000001" or "at_000002". Here, it is presumed that each authorization token has reached the expiration date and is thus in an invalid state.

In step S7.2, the resource server module 310 makes an authorization token verification request for inquiring whether the authorization token is valid to the authorization server module 210. The authorization server module 210 refers to the token table, checks whether the authorization token is valid, and transmits the result as a response. Since the authorization token is invalid as discussed above, then in step S7.3, the authorization server module 210 transmits an authorization token invalidity response to the resource server module 310. Then, in step S7.4, the resource server module 310 returns the authorization token invalidity response, which indicates that the authorization token is invalid, to the client application 420.

In step S7.5, the client application 420 makes an authorization token refresh request to the authorization server module 210. At that time, the client application 420 transmits the authorization token, the token ID "rt_000001" or "rt_000002" acquired with a refresh token response, the client ID "c001@xx.com", and the secret "xxxxxxxxxx".

In step S7.6, the authorization server module 210 authenticates the client based on a set of the acquired client ID "c001@xx.com", and the secret "xxxxxxxxxx". More specifically, the authorization server module 210 performs authentication by verifying whether acquired client ID and the secret match a client ID and secret in the client table. If the client authentication fails, the authorization server module 210 transmits an authentication error message as a response to the client application 420. If the client authentication succeeds, then in step S7.7, the authorization server module 210 verifies the acquired refresh token. The method for verifying the authorization code includes verifying whether the acquired refresh token is registered in the token table and, if registered, verifying whether the refresh token is valid. The method further includes verifying whether the client ID "c001@xx.com" acquired with the authorization token refresh request matches a client ID in the token table. Processing performed in a case where the result of the refresh token verification indicates [invalid] is described below. If the result of the refresh token verification indicates [valid], then in step S8.1, the authorization server module 210 performs authorization confirmation processing. The authorization confirmation processing in step S8.1 is described below together with the above-described authorization confirmation processing in step S2.1.

Next, if the result of the refresh token verification indicates [valid] and the result of the authorization confirmation processing in step S8.1 indicates [permission], then in step S9.1, the authorization server module 210 issues an authorization token. More specifically, the authorization server module 210 issues a token ID "at_000003" or "at_000004", and registers the UUID "10000001" of the user associated with the refresh token, the scope "read" or "group", and the authenticated client ID "c001@xx.com" in the token table. At that time, the authorization server module 210 sets the token type as an authorization token and registers the date and time of expiration of a period during which the authorization token is valid as an expiration date. As optional specifications of OAuth 2.0, the authorization server module 210 can be configured to reissue a refresh token in step S9.2. In that case, in step S9.3, the authorization server module 210 invalidates the used refresh token. More specifically, the authorization server module 210 issues the token ID "rt_000003" or "rt_000004", and then sets the state of the refresh token of "rt_000001" or "rt_000002" to "invalid". In the present exemplary embodiment, it is presumed that the reissuance processing for a refresh token is not performed.

Then, in step S9.4, the authorization server module 210 transmits the token ID of the issued authorization token as a response to the client application 420. In step S9.5, the client application 420, having acquired the authorization token, makes a resource request to an API which the resource server module 310 releases. The subsequent processing operations are similar to the processing operations in step S4.1 and steps S3.12 to S3.14 illustrated in FIG. 4 and thus, detailed descriptions are, omitted herein.

Next, a sequence performed in a case where, in the authorization server module 210, the result of the refresh token verification indicates [invalid] or the result of the authorization confirmation processing in step S8.1 indicates [denial] is described. In step S9.1, the authorization server module 210 transmits a response indicating the refresh token is invalid to the client application 420. The client application 420, having received the response indicating the refresh token is invalid, performs the above-described authorization request processing in step S1.3. The subsequent processing operations are similar to those in the sequence described with reference to FIG. 4 and thus are omitted from the following description.

Thus far, the refresh sequence in the authority transfer protocol for the client application 420 to refresh the authorization token and use an API that the resource server module 310 releases has been described.

Next, the authorization confirmation processing in step S2.1 described with reference to FIG. 4, which is one of features of the present exemplary embodiment, is described with reference to FIG. 7 and FIGS. 8A and 8B. Using the authorization confirmation processing in step S2.1 enables issuing an authorization token based on the above-mentioned scope group.

When the authorization confirmation processing in step S2.1 is performed, in step S10.1, the authorization server module 210 acquires the UUID and the scope corresponding to the user ID. Here, is presumed that the UUID is "10000001" and the scope is "read" or "group". Next, in step S10.2, the authorization server module 210 acquires the authority of the user using the UUID acquired in step S10.1. More specifically, the authorization server module 210 acquires authority information "device setting person" and "setting value referencing person" from the user table in the authorization server module 210 using the UUID "10000001".

While, in step S10.3, the authorization server module 210 performs loop processing in a case where a plurality of scopes is acquired in step S10.1, in the present exemplary embodiment, it is presumed that a single scope "read" or "group" is specified.

In step S10.4, the authorization server module 210 branches the processing according to whether the scope is a scope group. At that time, while the authorization server module 210 checks the authority information in the scope definition table in the authorization server module 210, and, if the authority information is "group", determines that the scope is a scope group, this is not limiting. For example, an item for discriminating between a scope and a scope group can additionally be provided, or a scope ID with a prefix or postfix attached thereto can be provided as one of formats of the scope ID to discriminate between a scope and a scope group. If the result indicates "read", which is not a scope group (NO in step S10.4), the processing proceeds to step S10.5, and, if the result indicates "group", which is a scope group (YES in step S10.4), the processing proceeds to step S10.8.

In step S10.5, the authorization server module 210 checks the scope and the authority of the user. More specifically, the authorization server module 210 checks whether the authority information in the scope definition table is included in the authority of the user acquired in step S10.2. More specifically, since "setting value referencing person" is defined as authority information in the scope "read", it is checked whether "setting value referencing person" is included in the authority of the user acquired in step S10.2. If, in step S10.6, it is determined that the user has the authority (YES in step S10.6), the loop processing in step S10.3 continues, and, if it is determined that the user has the authority with respect to all of the scopes, the processing proceeds to step S10.11. If, in step S10.6, it is determined that the user does not have the authority (NO in step S10.6), then in step S10.7, the authorization server module 210 transmits an authority error message as a response, and the processing ends. In the present exemplary embodiment, since "setting value referencing person" is included in the authority of the user, it is determined that the user has the authority, and the processing thus proceeds to step S10.11.

If, in step S10.4, it is determined that the scope is a scope group (YES in step S10.4), then in step S10.8, the authorization server module 210 acquires all of the scopes associated with the scope group. More specifically, the authorization server module 210 acquires group information from the scope definition table illustrated in Table 3. In the present exemplary embodiment, "admin, edit, read, device" is defined as the group information of the scope "group". Next, in step S10.9, the authorization server module 210 performs processing for checking the scope and the authority of the user, which is described in step S10.5, with respect to all of the acquired scopes. If, in step S10.10, it is determined that the user has the authority with respect to at least one of all of the scopes (YES in step S10.10), the loop processing in step S10.3 continues, and, if it is determined that the user has the authority with respect to all of the scopes, the processing proceeds to step S10.11.

If, in step S10.10, it is determined that the user does not have the authority with respect to any of the scopes (NO in step S10.10, then in step S10.7, the authorization server module 210 transmits an authority error message as a response, and the processing ends. In the present exemplary embodiment, since "setting value referencing person" and "device setting person" are included in the authority of the user, and the authority information of the scope "read" matches the scope "device", it is determined that the user has two authorities. As a result, since it is determined that the user has the authority in step S10.10, the processing proceeds to step S10.11. To enable determining that the user has the authority if the user has the authority with respect to at least one of the scopes, without checking the authority with respect to all of the scopes acquired in step S10.8, the authorization server module 210 can be configured to stop the processing when it is determined that the user has the authority with respect to even one scope on the way and to determine that the user has the authority in step S10.10.

In step S10.11, the authorization server module 210 transmits an authorization confirmation screen as a response to the web browser 410. FIG. 8A illustrates an example of an authorization confirmation screen that is transmitted as a response in a case where a scope that is not a scope group is specified. FIG. 8B illustrates an example of an authorization confirmation screen that is transmitted as a response in a case where a scope group is specified. Similar portions of these screens are assigned the respective same reference numerals. Each of the authorization confirmation screens 8000 and 8100 includes an access source display region 8001, which is a region used to display a client name acquired from the client table with a client ID included in the authorization request used as a key. Each screen includes a transferred authority display region 8002, which is a region used to display a description corresponding to the scope acquired in the authorization request. In the case of the present exemplary embodiment, since the scopes corresponding to all of the functions included in a service which the resource server module 310 provides are associated with "group" indicating a scope group, the transferred authority display region 8002 is used to display a description indicating that authorities possessed by the user in the authorities corresponding to all of the scopes are the range of authority transfer.

The description indicating that authorities possessed by the user in the authorities corresponding to all of the scopes are the range of authority transfer does not need to be displayed in the authorization confirmation screen 8000. Even in a case where that description is not displayed, it is necessary to display information indicating that the client application 420 can use a web service that the resource server module 310 provides in the range of at least one scope associated with the scope group, in the case of the present exemplary embodiment, in the range of "admin, edit, read, device". Rach of the authorization confirmation screens 8000 and 8100 includes a permission button 8003, which is used by the user to perform an authorization operation, and a denial button 8004, which is used to deny authorization, with respect to the content of the above-described information. As illustrated in FIG. 8B, the authorization confirmation screen 8100 can include a scope group description region 8101, which is a region used to display a description indicating that, in a case where a scope group is specified, the range of authorities to be transferred displayed in the transferred authority display region 8002 is dynamically changed according to a change in the authority of the user.

In step S10.12, the web browser 410 presents the acquired authorization confirmation screen 8000 or 8100 to the user. Then, in step S10.13, when the user presses the permission button 8003 or the denial button 8004, the web browser 410 acquires a result of the authorization confirmation and transmits the acquired result to the authorization server module 210.

In step S10.14, the authorization server module 210 acquires the authorization confirmation result. Next, if, in step S10.15, it is determined that the authorization confirmation result acquired in step S10.14 indicates permission (YES in step S10.15), then in step S10.16, the authorization server module 210 sets the result of the authorization confirmation processing as "permission response", and the processing ends. If it is determined that the authorization confirmation result indicates denial (NO in step S10.15), then in step S10.17, the authorization server module 210 sets the result of the authorization confirmation processing as "denial response", and the processing ends.

Thus far, the authorization confirmation processing, which is one of features of the present exemplary embodiment, has been described. Using the authorization confirmation processing enables issuing an authorization token based on a scope group. The authorization confirmation processing in step S8.1 in the refresh sequence illustrated in FIG. 6 is similar to the authorization confirmation processing in step S2.1 except that the user UUID and the scope are acquired from the refresh token in step S10.1, the permission response is returned when the loop processing in step S10.3 ends, and the denial response is returned when the authority error message is transmitted in step S10.7, and is, therefore, omitted from the description.

Next, the authority verification processing in step S4.1 described with reference to FIG. 4, which is one of features of the present exemplary embodiment, is described with reference to FIG. 9. When the authority verification processing in step S4.1 is used, in the case of an authorization token acquired with a scope group specified, the authority verification is implemented in the range of a scope included in the scope group. Then, if the user possesses the authority corresponding to the scope, the result of the authority verification indicates that the user has the authority.

In step S11.1, the authorization server module 210 acquires, from the acquired authorization token, all of the scopes associated therewith and the UUID of the user. In the present exemplary embodiment, a case where "at_000001" or "at_000002" is acquired as the authorization token is individually described. In the case of the authorization token "at_000001", the UUID "10000001" of the user and the scope "read" are acquired based on the token table illustrated in Table 5 in the authorization server module 210. In the case of the authorization token "at_000002", the UUID "10000001" of the user and the scope "group" are acquired based on the token table in the authorization server module 210.

Next, in step S11.2, the authorization server module 210 performs loop processing as much as the number of the acquired scopes, but, in the present exemplary embodiment, a case where one scope is acquired is individually described. In step S11.3, the authorization server module 210 branches the processing according to whether the acquired scope is a scope group. At that time, the authorization server module 210 checks the authority information in the scope definition table in the authorization server module 210 and, if the authority information is "group", determines that the acquired scope is a scope group, but this method is not limiting.

For example, an item for discriminating between a scope and a scope group can additionally be provided, or a scope ID with a prefix or postfix attached thereto can be provided as one of formats of the scope ID to discriminate between a scope and a scope group. If the result indicates "read", which is not a scope group (NO in step S11.3), the loop processing in step S11.2 is continued, and, if the loop processing is completed on all of the scopes, the processing proceeds to step S11.5. If the result indicates "group", which is a scope group (YES in step S11.3), the processing proceeds to step S11.4.

In step S11.4, the authorization server module 210 acquires all of the scopes associated with the scope group. More specifically, the authorization server module 210 acquires group information from the scope definition table. In the present exemplary embodiment, "admin, edit, read, device" is defined as the group information of the scope "group". Then, the authorization server module 210 disaggregates the acquired group information and then stores the respective scopes as subsequent processing targets. Then, the loop processing in step S11.2 is continued, and, if the loop processing is completed on all of the scopes, the processing proceeds to step S11.5.

In step S11.5, the authorization server module 210 acquires the authority of the user using the UUID acquired in step S11.1. More specifically, the authorization server module 210 acquires authority information "device setting person" and "setting value referencing person" from the user table in the authorization server module 210 using the UUID "10000001".

In step S11.6, the authorization server module 210 performs loop processing as much as the number of scopes targeted for verification included in the authority verification request. In the present exemplary embodiment, it is presumed that "read", which is a scope for referring to a setting value, is specified as a scope targeted for verification.

In step S11.7, the authorization server module 210 verifies whether the scope targeted for verification is included in one or a plurality of scopes acquired from the token, which includes a result obtained by disaggregating the scope group in the loop processing in step S11.2. If it is determined that the scope targeted for verification is not included in the scopes acquired from the token (NO in step S11.7), then in step S11.8, the authorization server module 210 determines that the user does not have the authority and stores the result of verification as a response. Then, the loop processing in step S11.6 continues.

If, in step S11.7, it is determined that the scope targeted for verification is included in the scopes acquired from the token (YES in step S11.7), then in step S11.9, the authorization server module 210 checks the scope targeted for verification and the authority of the user. In the present exemplary embodiment, since the scope acquired from the authorization token "at_000001" is "read", it is determined that the scope "read" targeted for verification is included, and the processing proceeds to step S11.9. Since the scopes acquired from the authorization token "at_000002" are "admin", "edit", "read", and "device", it is determined that the scope targeted for verification is included, and the processing proceeds to step S11.9.

In step S11.9, the authorization server module 210 checks the scope targeted for verification and the authority of the user. More specifically, the authorization server module 210 checks whether the authority information in the scope definition table is included in the authority of the user acquired in step S11.5. More specifically, since "setting value referencing person" is defined as the authority information with respect to the scope "read" targeted for verification, it is checked whether "setting value referencing person" is included in the authority of the user acquired in step S11.5. If, in step S11.9, it is determined that the authority information in the scope definition table is included, then in step S11.10, the authorization server module 210 determines that the user has the authority with respect to the scope targeted for verification, and stores the result of verification. If it is determined that the authority information in the scope definition table is not included, the authorization server module 210 determines that the user does not have the authority with respect to the scope targeted for verification, and stores the result of verification. Then, the loop processing in step S11.6 continues, and, if the authority verification is completed on all of the scopes targeted for verification, then in step S11.11, the authorization server module 210 transmits the results of verification as a response, and the processing ends. At that time, the authorization server module 210 transmits all of the stored results of authority verification as a response. For example, in a case where a plurality of scopes is included in the verification request, the results of verification with respect to the respective scopes are transmitted as a response. In the present exemplary embodiment, the result indicating that the user has the authority is transmitted as a response with respect to both "at_000001" and "at_000002".

Thus far the authority verification processing in the authorization server module 210 has been described. With this processing, in the case of an authorization token acquired with a scope group specified, the scope group is disaggregated and verified. Therefore, in the range of scopes included in the scope group, without the implementation of the authorization processing of the user, verification and determination of the authority of the user, i.e., the processing in step S11.9, can be performed. In other words, with respect to a change in the authority of the user, the authority verification processing adapted to the authority of the user can be performed without forcing the user to re-perform the authorization confirmation processing.

Figure 10A:
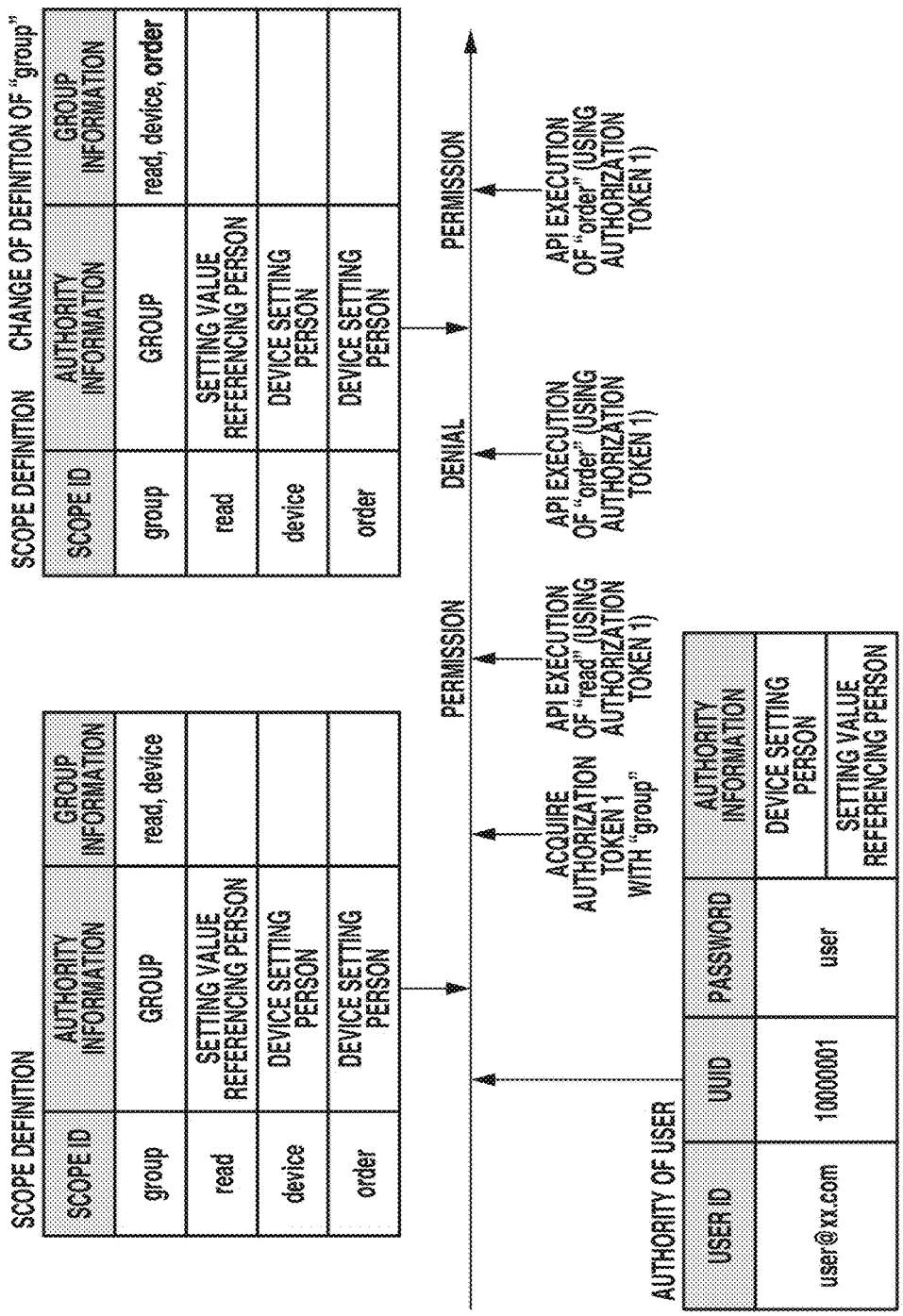

Next, in, for example, OAuth 2.0, a case where the use of an API can continue without requiring re-authorization of the user even if there is a change in the scope definition and a case where the use of an API is can continue without requiring re-authorization of the user even if there is a change in the authority of the user are described in a time-series manner with reference to FIGS. 10A and 10B.

FIG. 10A illustrates a change of the scope definition and a behavior of permission or denial of API execution in a time-series manner. In FIG. 10A, the rightwards arrow indicates a time axis. Arrows leading to the time axis indicate the scope definition, the authority of the user, and the request for use of an API from the client application 420 to the resource server module 310 and its result, at particular times pointed by the arrows.

First, as illustrated in FIG. 10A, the user "user@xx.com" possesses "device setting person" and "setting value referencing person" as the authority information thereof. Next, the scope definition is as illustrated in FIG. 10A. In particular, the scope ID "group" includes scopes "read" and "device" as members thereof.

In that state, it is presumed that the client application 420 has acquired an authorization token 1 with the scope "group". The sequence and flow for acquiring the authorization token are as described above.

Next, the client application 420 executes an API to a resource for requesting the scope "read" of the resource server module 310 using the acquired authorization token 1. As a result, since the scope "read" is included in the scope group "group" and the user has the authority of "setting value referencing person", which is an authority associated with the scope "read", the execution of the API succeeds.

Next, the client application 420 executes an API to a resource for requesting the scope "order" of the resource server module 310 using the acquired authorization token 1. As a result, since the scope "order" is not included in the scope group "group", the execution of the API is denied without verifying the authority of the user. This is the state described above as an issue to be solved. In other words, unless another authorization token is acquired by specifying the scope "order" and re-processing Authorization Code Grant in OAuth 2.0, the user is not able to use the API, so that the user is required to perform an authorization operation once more.

Next, it is presumed that the scope "order" is added to the members of the scope "group" in the scope definition. After that, the client application 420 re-executes an API to a resource for requesting the scope "order" of the resource server module 310 using the acquired authorization token 1. As a result, since the scope "order" is included in the scope group "group" and the user has the authority of "device setting person", which is an authority associated with the scope "order", the execution of the API succeeds.

In other words, as long as the user is assigned the authority, the authorization token acquired with "group" specified is able to directly use an API that requires the scope "order". As a result, in a case where a new function is added to the resource server module 310, the client application 420 can use an API for invoking the new function without requesting the user to perform processing for reissuing an authorization token.

FIG. 10B illustrates a change of the user authority and a behavior of permission or denial of API execution in a time-series manner. In FIG. 10B, the rightwards arrow indicates a time axis. Arrows leading to the time axis indicate the scope definition, the authority of the user, and the request for use of an API from the client application 420 to the resource server module 310 and its result, at particular times pointed by the arrows.

First, as illustrated in FIG. 10B, the user "user@xx.com" possesses "device setting person" and "setting value referencing person" as the authority information thereof. Next, the scope definition is as illustrated in FIG. 10B. In particular, the scope ID "group" includes scopes "read", "device", and "order" as members thereof. "Installation worker" is defined as the authority information associated with the scope "order".

In that state, it is presumed that the client application 420 has acquired an authorization token 1 with the scope "group". The sequence and flow for acquiring the authorization token are as described above. While not illustrated, in a case where the client application 420 attempts to acquire the authorization token 1 with the scope "order" specified, since the user does not have the authority as described above, the acquisition fails.

Next, the client application 420 executes an API to a resource for requesting the scope "read" of the resource server module 310 using the acquired authorization token 1. As a result, since the scope "read" is included in the scope group "group" and the user has the authority of "setting value referencing person", which is an authority associated with the scope "read", the execution of the API succeeds.

Next, the client application 420 executes an API to a resource for requesting the scope "order" of the resource server module 310 using the acquired authorization token 1. As a result, while the scope "order" is included in the scope group "group", since the user does not have the authority of "installation worker", which is an authority associated with the scope "order", the execution of the API is denied. This is the presumed state.

Next, the user "user@xx.com" is assigned the authority of "installation worker". After that, the client application 420 re-executes an API to a resource for requesting the scope "order" of the resource server module 310 with the use of the acquired authorization token 1. As a result, since the scope "order" is included in the scope group "group" and the user has the authority of "installation worker", which is an authority associated with the scope "order", the execution of the API succeeds. In other words, in a case where there is a change in the authority of the user, the client application 420 can directly use an API that requires the scope "order", without re-processing Authorization Code Grant in OAuth 2.0.

As described above, according to the present exemplary embodiment, a scope group is defined and authority transfer is performed by using the scope group, so that, even when there is a change in the authority of the user, the use of an API can be continued in the range of the changed authority of the user without requesting the user to re-perform an authorization operation. Even when there is a change in the scope according to the addition of a new function of the service, the use of APIs including an API corresponding to the new function can also be continued according to the authority of the user without requesting the user to re-perform an authorization operation.

In a case where a scope group is specified in the authorization confirmation processing illustrated in FIG. 7, using an authorization token acquired without requiring authorization confirmation processing or using a refreshed authorization token enables using an API of the resource server module 310 in the range of the authority of the user.

At the time of performing authority transfer, for example, a case where the security requirement of an organization is severe in the event of enterprise use or a case where, in the event of the use by a user with high security, transferring the authority in the range that is not specified in detail on the authorization confirmation screen or transferring the authority that is not currently possessed is not permitted is conceivable.

In the description of a second exemplary embodiment, in the above-mentioned case, depending on a specific condition, even when the client application 420 starts processing for the authority transfer protocol with a scope group specified, authority transfer is performed not with the scope group, but with a scope limited within the range of the authority possessed by the user.

FIG. 11 illustrates an example of an OAuth 2.0 setting screen for setting the above-mentioned specific condition in the authorization server module 210. In other words, a condition for, even if a scope group is specified, not performing authority transfer with a group but performing authority transfer only within the range in which the user has the authority in the group. The OAuth 2.0 setting screen 11000, which the authorization server module 210 presents, is configured with overall setting 11001, which is used for the overall setting, client setting 11002, which is used for the setting for each client, and scope group setting 11003, which is used for the setting for each scope group. In the case of enterprise use, these settings can be provided as the setting for the entire organization or can be provided as the setting for each user. A "save" button 11004 can be pressed to perform setting on the authorization server module 210. A "close" button 11005 is a button used to close the OAuth 2.0 setting screen without performing setting on the authorization server module 210.

In a case where the overall setting 11001 is set available, setting is performed such that, even if a scope group is specified, the authority is always transferred only in the range of the authority possessed by the user. Next, in a case where the client setting 11002 is set available, setting is performed such that, in the case of an authorization request from a particular client that is set available, even if a scope group is specified, the authority is transferred only in the range of the authority possessed by the user. Lastly, in a case where the scope group setting 11003 is set available, setting is performed such that, when a particular scope group that is set available is specified, the authority is transferred only in the range of the authority possessed by the user within the range of the particular scope group.

Figure 12:
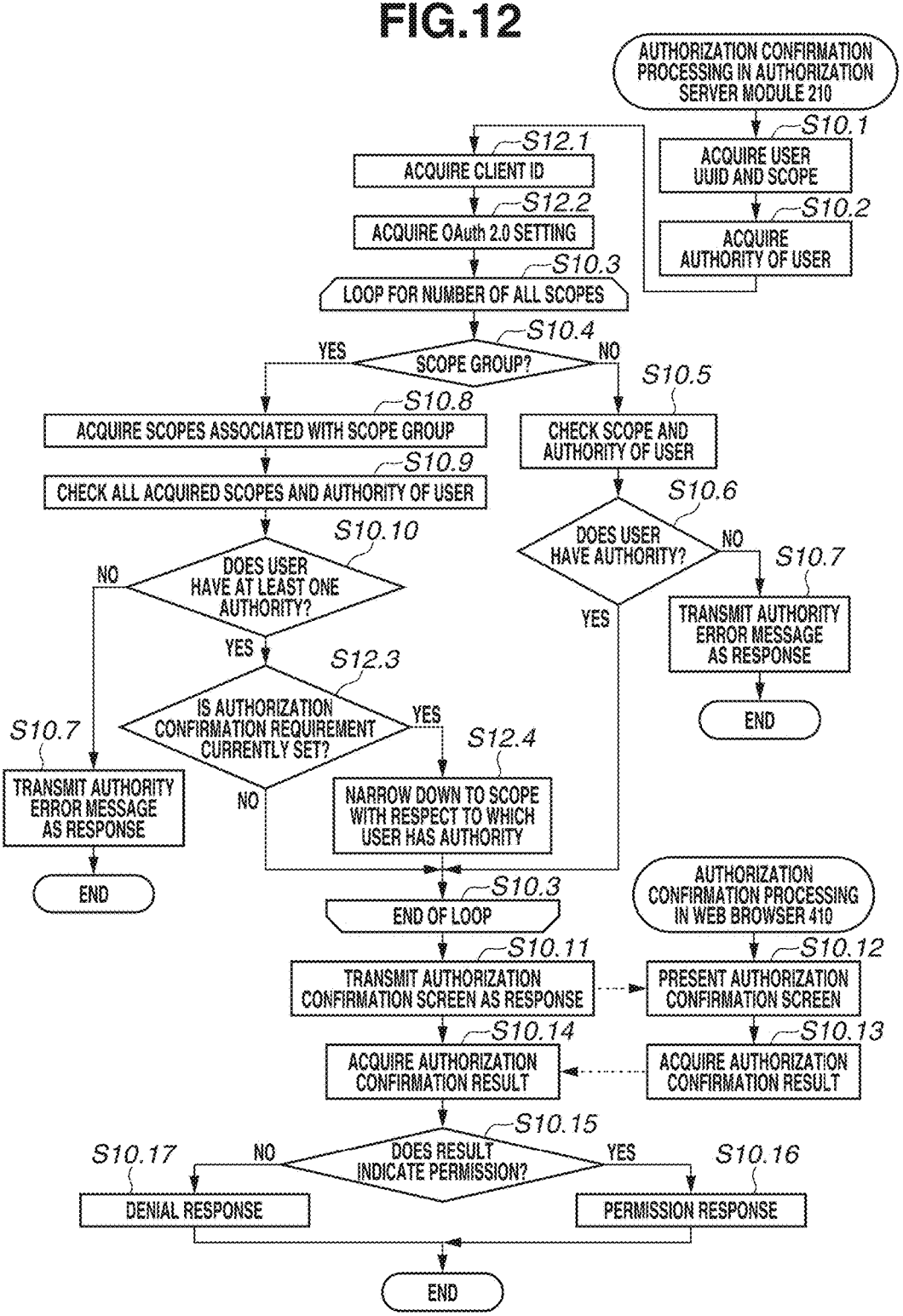
FIG. 12 is a flowchart illustrating authorization confirmation processing in the second exemplary embodiment.

FIG. 12 is a flowchart illustrating the flow in which the processing in the second exemplary embodiment is added to the authorization confirmation processing in the authorization server module 210 described with reference to FIG. 7. Steps for performing processing similar to that illustrated in FIG. 7 are assigned the same respective step numbers, and their associated descriptions are omitted from the following description. In step S12.1, the authorization server module 210, after acquiring the user information and the scope, also acquires the client information, more specifically, the client ID of the client application 420 that made the authorization request. In the present exemplary embodiment, the client ID "c001@xx.com" is acquired. Next, in step S12.2, the authorization server module 210 acquires setting information about a particular condition via the OAuth 2.0 setting screen described with reference to FIG. 11.

Subsequently, after performing processing in steps S10.8 to S10.10, then in step S12.3, the authorization server module 210 verifies whether the setting information matches the particular condition. More specifically, the authorization server module 210 checks whether the overall setting 11001 is currently set, whether the client corresponding to the client ID acquired in step S12.1 is currently set in the client setting 11002, or whether the scope group that is currently verified is currently set in the scope group setting 11003. If any one of the settings matches the particular condition, the authorization server module 210 determines that the authorization confirmation requirement is currently set (YES in step S12.3), and the processing then proceeds to step S12.4. If none of the settings match the particular condition (NO in step S12.3), the processing proceeds to the loop processing in step S10.3, and, then, the subsequent steps are performed as described above with reference to FIG. 7.

In step S12.4, the authorization server module 210 extracts only the scope with respect to which it is determined that the user has the authority as a result of checking the scopes and the authority of the user in step S10.9. Then, the authorization server module 210 deems that the authorization request is made with respect to not the scope group that is currently verified about the authorization request, but only the extracted scope with respect to which the user has the authority and replaces the scope group with the scope, and the loop processing in step S10.3 continues. In other words, in the authorization confirmation screen response in step S10.11, while the authorization confirmation screen illustrated in FIG. 8B is transmitted as a response in the case of the scope group, since the scope group is replaced with the scope with respect to which the user has the authority, the authorization confirmation screen illustrated in FIG. 8A is transmitted instead as a response.

The subsequent processing operations are as described above with reference to FIG. 7.

As described above, depending on a particular condition, even if the client application 420 starts processing for the authority transfer protocol with a scope group specified, authority transfer can be performed with respect to not the scope group but a scope limited in the range of the authority possessed by the user.

In the authorization confirmation processing described with reference to FIG. 12, authorization confirmation is forcibly performed only in a case where a particular condition is set. However, for example, in the case of consumer use, previously implementing the OAuth 2.0 setting is troublesome, and in the case of leakage of the setting, authorization confirmation processing is automatically performed with a scope group. This can enable a malicious system administrator to change the scope definition in the authorization server module 210 so that the authority transfer that is not intended by the user is performed.

For example, the malicious system administrator can define a scope group in which the user is unlikely to feel resistance in authorization, can allow the user to perform an authorization operation, and then can cause a scope which the user hesitates to authorize to belong to the scope group. Therefore, according to a third exemplary embodiment described as follows, every time the user performs an authorization operation, the user is allowed to select whether to perform authority transfer with a scope group or whether to perform authority transfer only in the range of the authority of the user. The third exemplary embodiment is implemented by the authority transfer system described in the first exemplary embodiment or the second exemplary embodiment.

Figure 13:
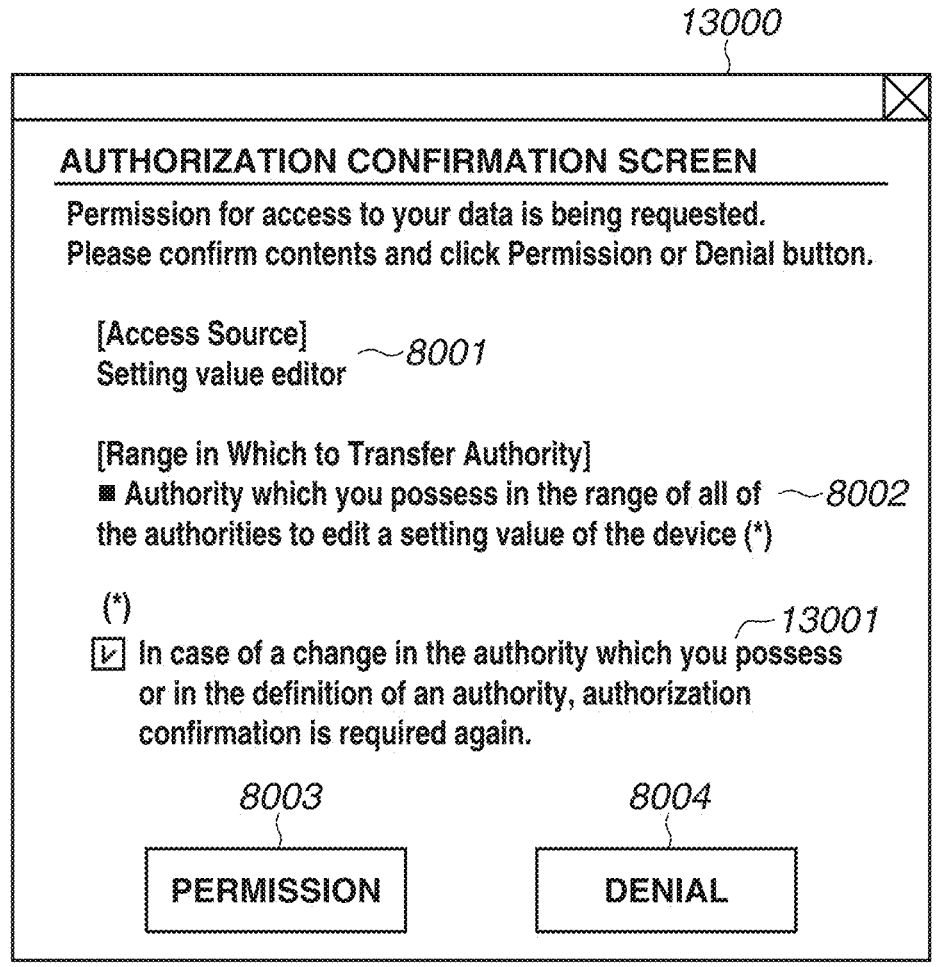
FIG. 13 illustrates an example of an authorization confirmation screen in a third exemplary embodiment.

FIG. 13 illustrates an example of an authorization confirmation screen that is transmitted as a response in step S10.11 in a case where authority transfer is performed with a scope group in the authorization confirmation processing described with reference to FIG. 7 or FIG. 12. Here, a user confirmation item 13001, which is an item enabling selecting whether to perform authority transfer with a scope group, is added to the authorization confirmation screen 8100 described with reference to FIG. 8B. When the user confirmation item 13001 is selected, at the time of performing confirmation in step S10.9, the authorization server module 210 extracts only a scope with respect to which it is determined that the user has the authority as a result of confirmation of the scopes and the authority of the user, and re-displays the extracted scope at the transferred authority display region 8002. As a result, the state of the transferred authority display region 8002 of the authorization confirmation screen 13000 illustrated in FIG. 13 is changed to the state of the transferred authority display region 8002 of the authorization confirmation screen 8000 illustrated in FIG. 8A.

After that, when the permission button 8003 is pressed, in step S10.16, the authorization server module 210 transmits a permission response, and uses, as the scope to be associated for issuing an authorization code in step S3.1, not a scope group but a scope with respect to which it is determined that the user has the authority as a result of the confirmation of the scopes and the authority of the user performed in step S10.9. In other words, in step S10.11, the scope acquired in step S10.1 is changed to the scope with respect to which it is determined in step S10.9 that the user has the authority, so that the same result as that obtained by performing processing in steps S10.2, S10.3, S10.4, S10.5, and S10.6 can be obtained.

The subsequent processing operations are as described above with reference to FIG. 4, and only the scope with respect to which it is determined in step S10.9 that the user has the authority is set as the scope to be registered in the token table in the authorization server module 210 during the authorization code issuance processing in step S3.1. As a result, the scope associated with an authorization token to be issued is not a scope group but a scope with respect to which it is determined in step S10.9 that the user has the authority. In a case where the permission button 8003 is pressed in the authorization confirmation screen 13000 while the user confirmation item 13001 is not checked off, authority transfer is performed with a scope group. In other words, the scope to be registered in the token table in the authorization server module 210 during the authorization code issuance processing in step S3.1 is a scope group. As a result, the scope associated with an authorization token to be issued is a scope group.

With the above-described processing, the user is allowed to use the authorization confirmation screen with respect to the authorization server module 210 so as to select whether to perform authority transfer with a scope group or whether to perform authority transfer only in the range of the authority possessed by the user. As a result, a situation that the authority transfer not intended by the user can be performed by a malicious system administrator changing the setting of a scope group can be prevented.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-115518 filed Jun. 9, 2016, which is hereby incorporated by reference herein in its entirety.

What is claimed is:

1. An authorization server that performs authentication processing and authorization processing for a resource server that provides a web service, the authorization server comprising:

at least one processor and at least one memory in communication with the at least one processor and having stored thereon instructions, when executed by the at least one processor, and cooperating to act as:

a reception unit configured to receive, from a client, an authorization request specifying a scope group with which at least one scope that defines a range in which to use the web service is associated;

an issuance unit configured to issue authorization information associated with the scope group in response to an authenticated user performing an authorization operation for transferring an authority of the user in the web service to the client via an authorization confirmation screen displayed by a terminal including the client; and a verification unit configured to acquire at least one scope associated with the scope group when receiving a verification request for the authorization information transmitted for the client to use the web service, and, in a case where a scope targeted for verification specified by the verification request is included in the acquired at least one scope and a scope that defines a range in which the web service is usable with an authority possessed by the user is included in the acquired at least one scope, to transmit, to the resource server, information indicating that an authority to use the web service in the range defined by the scope targeted for verification is transferred to the client, wherein the issuance unit provides, to the terminal, a setting screen including an item enabling the user to specify whether to re-perform the authorization operation in a case where there is a change in an authority assigned to the user, and, in response to the user specifying re-performing the authorization operation, issues authorization information associated with only a scope that defines a range in which the web service is usable with an authority possessed by the user in at least one scope associated with the scope group.

2. The authorization server according to claim 1, wherein the authorization confirmation screen is provided to the terminal by the issuance unit, and, in a case where the authorization request specifying the scope group is received by the reception unit, the issuance unit provides, to the terminal, the authorization confirmation screen displaying information indicating that the web service is used by the client in the range of the at least one scope associated with the scope group.

3. The authorization server according to claim 1, wherein the authorization confirmation screen is provided to the terminal by the issuance unit, and the issuance unit provides, to the terminal, the authorization confirmation screen displaying information indicating that the client uses the web service with an authority transferred from the user.

4. The authorization server according to claim 1, wherein the authorization confirmation screen is provided to the terminal by the issuance unit, and the issuance unit provides, to the terminal, the authorization confirmation screen including an item enabling the user to specify whether to re-perform the authorization operation in a case where there is a change in an authority assigned to the user, and, in response to the user specifying re-performing the authorization operation, issues authorization information associated with only a scope that defines a range in which the web service is usable with an authority possessed by the user in at least one scope associated with the scope group.

5. The authorization server according to claim 1, wherein the web service includes a function to deliver a setting value to be set to a multifunction peripheral or a printer, and the client includes a function to generate the setting value and upload the setting value to the web service.

6. The authorization server according to claim 5, wherein at least one scope from a plurality of scopes each of which defines a range in which the web service is usable with any one of a plurality of authorities including an administrator authority, which enables every operation on the setting value, a setting value editor authority, which enables editing the setting value, a setting value referencing person authority, which enables referring to the setting value, and a device setting person authority, which enables setting, to the setting value, information for specifying a multifunction peripheral or a printer in which to reflect the setting value, is associated with the scope group.

7. A control method for an authorization server that performs authentication processing and authorization processing for a resource server that provides a web service, the control method comprising:
receiving, from a client, an authorization request specifying a scope group with which at least one scope that defines a range in which to use the web service is associated;
issuing authorization information associated with the scope group in response to an authenticated user performing an authorization operation for transferring an authority of the user in the web service to the client via an authorization confirmation screen displayed by a terminal including the client; and
acquiring at least one scope associated with the scope group when receiving a verification request for the authorization information transmitted for the client to use the web service, and, in a case where a scope targeted for verification specified by the verification request is included in the acquired at least one scope and a scope that defines a range in which the web service is usable with an authority possessed by the user is included in the acquired at least one scope, transmitting, to the resource server, information indicating that an authority to use the web service in the range defined by the scope targeted for verification is transferred to the client,
wherein a setting screen including an item enabling the user to specify whether to re-perform the authorization operation in a case where there is a change in an authority assigned to the user is provided to the terminal, and, in response to the user specifying re-performing the authorization operation, authorization information associated with only a scope that defines a range in which the web service is usable with an authority possessed by the user in at least one scope associated with the scope group is issued.

8. The control method according to claim 7, wherein, in a case where the authorization request specifying the scope group is received, the authorization confirmation screen displaying information indicating that the web service is used by the client in the range of the at least one scope associated with the scope group is provided to the terminal.

9. The control method according to claim 7, wherein the authorization confirmation screen displaying information indicating that the client uses the web service with an authority transferred from the user is provided to the terminal.

10. The control method according to claim 7, wherein the authorization confirmation screen including an item enabling the user to specify whether to re-perform the authorization operation in a case where there is a change in an authority assigned to the user is provided to the terminal, and, in response to the user specifying re-performing the authorization operation, authorization information associated with only a scope that defines a range in which the web service is usable with an authority possessed by the user in at least one scope associated with the scope group is issued.

11. The control method according to claim 7, wherein the web service includes a function to deliver a setting value to be set to a multifunction peripheral or a printer, and the client includes a function to generate the setting value and upload the setting value to the web service.

12. The control method according to claim 11, wherein at least one scope from a plurality of scopes each of which defines a range in which the web service is usable with any one of a plurality of authorities including an administrator authority, which enables every operation on the setting value, a setting value editor authority, which enables editing the setting value, a setting value referencing person authority, which enables referring to the setting value, and a device setting person authority, which enables setting, to the setting value, information for specifying a multifunction peripheral or a printer in which to reflect the setting value, is associated with the scope group.

13. A non-transitory computer-readable storage medium storing computer-executable instructions that, when executed by a computer, cause the computer to perform a method for controlling an authorization server that performs authentication processing and authorization processing for a resource server that provides a web service, the method comprising:

receiving, from a client, an authorization request specifying a scope group with which at least one scope that defines a range in which to use the web service is associated;

issuing authorization information associated with the scope group in response to an authenticated user performing an authorization operation for transferring an authority of the user in the web service to the client via an authorization confirmation screen displayed by a terminal including the client; and acquiring at least one scope associated with the scope group when receiving a verification request for the authorization information transmitted for the client to use the web service, and, in a case where a scope targeted for verification specified by the verification request is included in the acquired at least one scope and a scope that defines a range in which the web service is usable with an authority possessed by the user is included in the acquired at least one scope, transmitting, to the resource server, information indicating that an authority to use the web service in the range defined by the scope targeted for verification is transferred to the client, wherein a setting screen including an item enabling the user to specify whether to re-perform the authorization operation in a case where there is a change in an authority assigned to the user is provided to the terminal, and, in response to the user specifying re-performing the authorization operation, authorization information associated with only a scope that defines a range in which the web service is usable with an authority possessed by the user in at least one scope associated with the scope group is issued.

* * * * *